(12) United States Patent
Ovesea et al.

(10) Patent No.: US 10,776,147 B2
(45) Date of Patent: Sep. 15, 2020

(54) ORCHESTRATION ENGINE FOR MIGRATING APPLICATION DATA AND APPLICATION SERVICES USING MIGRATION STEPS IN MIGRATION COMPONENT

(71) Applicant: salesforce.com, inc., San Francisco, CA (US)

(72) Inventors: Alex Ovesea, Maple (CA); Ilya Zaslavsky, Toronto (CA); Chen Liu, San Mateo, CA (US); Alan Arbizu, Foster City, CA (US); Mikhail Chainani, San Francisco, CA (US); Xiaodan Wang, Dublin, CA (US); Sridevi Gopala Krishnan, Foster City, CA (US)

(73) Assignee: salesforce.com, inc., San Francisco, CA (US)

( * ) Notice: Subject to any disclaimer, the term of this patent is extended or adjusted under 35 U.S.C. 154(b) by 235 days.

(21) Appl. No.: 15/882,233

(22) Filed: Jan. 29, 2018

(65) Prior Publication Data
US 2019/0235895 A1 Aug. 1, 2019

(51) Int. Cl.
G06F 9/455 (2018.01)
G06F 9/48 (2006.01)

(52) U.S. Cl.
CPC ........ G06F 9/45558 (2013.01); G06F 9/4856 (2013.01); G06F 2009/4557 (2013.01)

(58) Field of Classification Search
None
See application file for complete search history.

(56) References Cited

U.S. PATENT DOCUMENTS

| 7,057,650 | B1* | 6/2006 | Sakamoto | H04N 1/3871 348/218.1 |
| 8,032,582 | B2* | 10/2011 | Martin | G06F 9/465 709/201 |
| 2014/0172782 | A1* | 6/2014 | Schuenzel | G06Q 50/22 707/609 |
| 2015/0178014 | A1* | 6/2015 | Nelson | G06F 3/0647 711/114 |
| 2016/0378547 | A1* | 12/2016 | Brouwer | G06F 9/4856 718/1 |
| 2019/0018670 | A1* | 1/2019 | Ramasamy | G06F 8/71 |

* cited by examiner

*Primary Examiner* — Meng Ai T An
*Assistant Examiner* — Zujia Xu
(74) *Attorney, Agent, or Firm* — Wong & Rees LLP; Zhichong Gu

(57) ABSTRACT

Migration configuration data for an organization migration to move application data and application services of a to-be-migrated organization hosted at a source system instance to a target system instance is received. Migration components respectively representing to-be-migrated systems of record in a to-be-migrated organization are registered. In response to receiving an instruction to enter a specific organization migration state, migration steps for each migration component in the migration components are identified for execution in the specific organization migration state. Each migration component in the migration components automatically executes migration steps determined for each such migration component for execution in the specific organization migration state.

21 Claims, 15 Drawing Sheets

```
{
  name: "Dual Phase Migration"
  components: [
  {
    name: "HBase",
    options: {
      clustered: true
    }
  },
  {
    name: "FileForce",
    options: {
      enableLem: true
    }
  },
  {
    name: "DualPhaseOracle"
    options: {
      slicer: true
    }
  }
  ]
}
```

FIG. 3A

```
public interface ComponentRegistry {
  boolean register(Component component);
  Component get(String name);
}
```

FIG. 3B

```
public class Command {
  private final Action action;
  private final String orgId;
}
public interface Component {
  execute(Command command);
}
public enum Action {
  SCHEDULE,
  PREPARE,
  MARK_AS_READ_ONLY,
  MOVE_TO_TARGET,
  ACTIVATE
}
```

FIG. 3C

```
for component in components
  component.execute(command)
```

FIG. 3D

```
public class Progress {
  private String orgId;
  private String value;
  private boolean done;
}
```

FIG. 3E

```
Component
isScheduled(String orgId) : Progress

Transition
progress() : Progress

Component
progressFor(Command command) : Progress
```

FIG. 3F

```
public interface Engine {
  void collect(Progress progress, Component component)
}
```

FIG. 3G

ORCHESTRATION ENGINE FOR MIGRATING APPLICATION DATA AND APPLICATION SERVICES USING MIGRATION STEPS IN MIGRATION COMPONENT

TECHNICAL FIELD

The present invention relates generally to organization migrations, and in particular, to an orchestration engine for migrating application data and application services of organizations between computing system instances.

BACKGROUND

A large-scale cloud-based computer system may include multiple datacenters at various geographic locations to maintain millions of sets of application data for millions of organizations as well as provide millions of sets of application services such as those for customer relationship management (CRM), secured data access, online transaction processing, mobile apps, etc., to respective users and/or customers of these organizations.

As the datacenters evolve over time, and as computing resource needs for the organizations evolve over time, at least some of the organizations may be relocated or migrated between computing instances of the same datacenter or even different datacenters.

Organization migrations may be carried out through close and intensive human supervision from experts experienced in various aspects relating to migrating application data and application services in the data centers. Even if these experts could be available during entire time periods of organization migrations, a large amount of manual input and human supervision may lead to inefficiencies, errors, lack of transparency, degradations, system resource contentions, prolonged downtimes, and even failures.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 3A illustrates example migration configuration data; FIG. 3B through FIG. 3G illustrate example interfaces, classes and/or interfaces for some processing entities in organization migrations;

DESCRIPTION OF EXAMPLE EMBODIMENTS

Figure 1A:
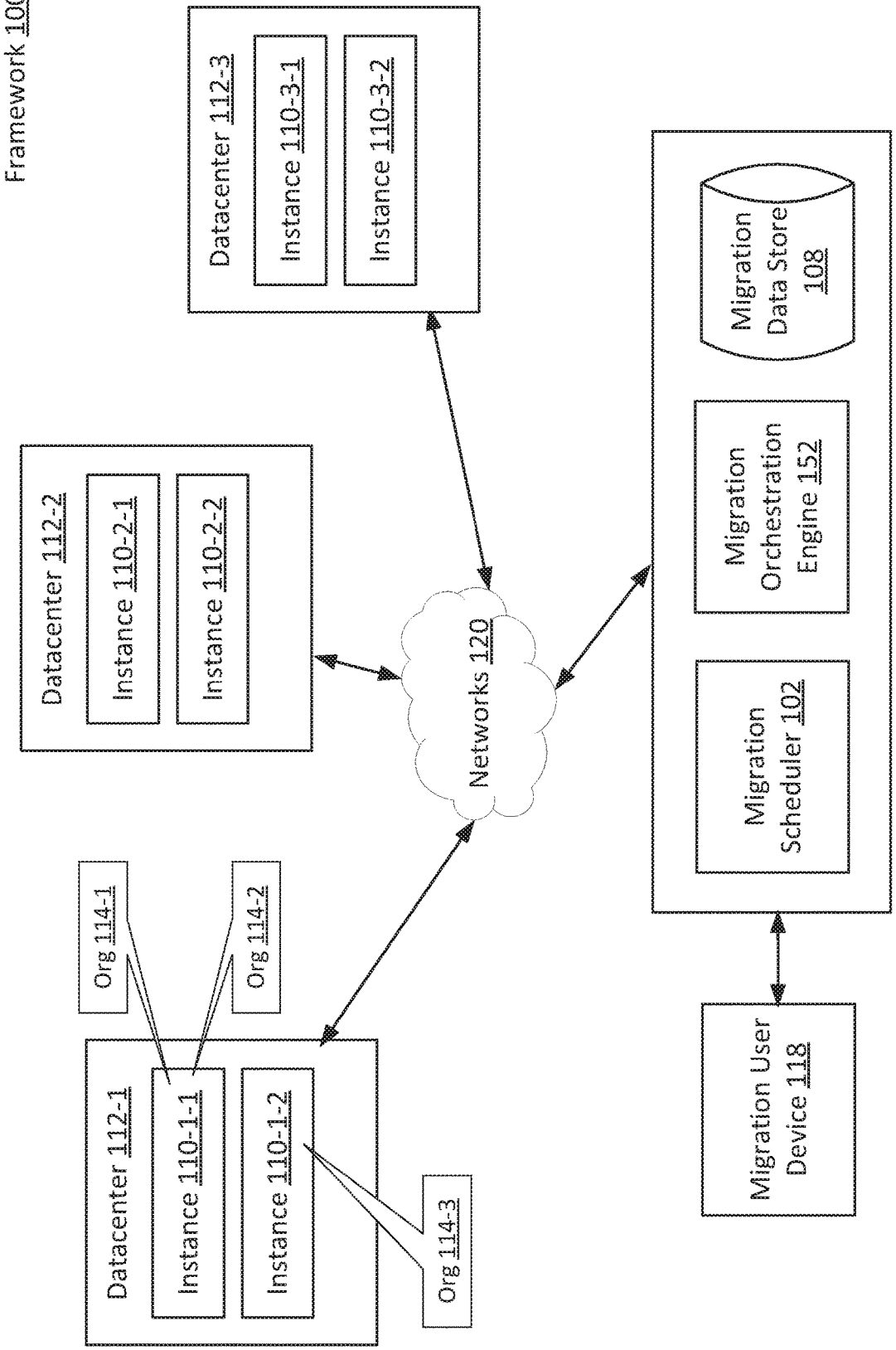
FIG. 1A illustrates an example overall organization migration framework.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. General Overview
2.0. Functional Overview
   2.1. Coordinating Organization Migrations with Scheduler
   2.2. Migration Stages/States of Organization Migrations
   2.3. Migration Configuration Data
   2.4. Example Organization Migrations
   2.5. Example Alternative Component Designs
   2.6. Example Object Design for Executing Migration Steps
   2.7. Example Alternative System Configuration
3.0. Example Embodiments
4.0 Implementation Mechanism—Hardware Overview
5.0. Extensions and Alternatives

1.0 GENERAL OVERVIEW

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Techniques as described herein can be used by a migration orchestration engine to carry out (e.g., mass, etc.) organization migrations each of which moves both application data and application services of an organization (or tenant) from a source system instance of a computing system to a target system instance of the computing system. The migration orchestration engine can interact with a migration scheduler to carry out a plurality of organization migrations within a selected time window such as a relatively short downtime window, and so forth. Examples of migration schedulers can be found in U.S. patent application Ser. No. 15/882,194, with an application title of "SCHEDULING FRAMEWORK FOR ORGANIZATION MIGRATIONS" by Chen Liu, Sridevi Gopala Krishnan, Ilya Zaslaysky, Alex Ovesea, Mikhail Chainani and Xiaodan Wang, filed on Jan. 29, 2018, the entire contents of which are hereby incorporated by reference as if fully set forth herein. Examples of resource usage monitoring and migration flow control can be found in U.S. patent application Ser. No. 15/882,266, with an application title of "MIGRATION FLOW CONTROL" by Ilya Zaslaysky, Mikhail Chainani, Alex Ovesea, Vijay Devadhar, Xiaodan Wang and Alan Arbizu, filed on Jan. 29, 2018, the entire contents of which are hereby incorporated by reference as if fully set forth herein.

Organization migrations as described herein represent a part of normally planed operations in the computing system—which may host a relatively large number of organizations or tenants—to migrate some or all of the hosted organizations efficiently, automatically and accurately with little human intervention in the selected time window. Additionally, optionally or alternatively, the organization migrations can be performed with better load balancing and performance tuning than under other approaches that do not implement techniques as described herein. The selected time window represents a normally planned shutdown time period that affects only the organizations (e.g., locks out users and/or customers of the organization, allows only read-only access, etc.) being migrated in the selected time window and does not affect any other organizations (hosted in the source and target system instances) that are not migrated during the selected time window.

It should be noted that organization migrations as described herein can operate in conjunction with other system functions relating to data backup, fault tolerance and/or high availability of the system instances and the datacenters, but there is no need for the organization migration to be used to directly provide these other system functions.

An organization migration as described herein moves (e.g., entire hosted, etc.) application data and application services of an organization from a first point of deployment (POD) such as a source system instance in a datacenter to another POD such as a target system instance in the same or a different datacenter in the selected time window in which the application data and application services based at least in part on the application data may be temporarily unavailable (but may still provide read-only access in some embodiments) to users and/or customers of the organization. However, all other organizations or tenants hosted in the source system instances and/or the target system instance, which are not migrated in the selected time window, are not affected under techniques as described herein. In other words, users and/or customers of these other organizations can access their respective application data and their respective application services normally, without even being able to notice any concurrent organization migrations are being performed from the source system instance to the target system instance in the selected time window.

At the end of the organization migration (e.g., within the selected time window, etc.), the application data and the application service of the organization are no longer provided from the source system instance, but rather are provided from the target system instance. In other words, before the organization migration, the source system instance hosts the application data and the application services of the organization and provides computing resources to the organization, while the target system instance is not involved in providing computing resources to the organization. After the organization migration, the target system instance hosts the application data and the application services of the organization and provides computing resources to the organization, while the source system instance is no longer involved in providing any computing resources to the organization. Users and/or customers of the migrated organization can access the pre- and post-migration application data and services at user and application levels essentially in the same manner before and after the selected time window.

A migration user, who may be an operator, an administrator, an authorized user, a designated user, etc., for requesting and monitoring organization migration(s), can send or issue a request for a specific organization migration, for example through a web portal or an organization migration web page, to the migration scheduler. For a single-phase organization migration, migration specific actions (or migration steps) can be (e.g., entirely, largely, etc.) performed within a selected time window. For a dual-phase organization migration, some (e.g., non-critical, etc.) migration specific actions can be performed, before the selected time window, while some or all of application data and application services of an organization in the migration are still be accessible (e.g., read-only for some and read-and-write for others, etc.) to users and/or customers of the organization being migrated; some (e.g., service/access impactful, etc.) migration specific actions can be performed, within the selected time window, while the application data and the application services of the organization in the migration become (e.g., largely, entirely, etc.) non-accessible (e.g., except for read-only access in some embodiments, etc.) to the users and/or customers of the organization.

An organization to be migrated (in an organization migration) may comprise various components (e.g., HBase, FileForce or FFX, etc.) each of which contains application data and application services that are to be migrated as a part of an organization migration. As used herein, a component (e.g., a to-be-migrated component, a component represented by a migration component object, etc.) refers to a system of record that contains its respective application data (e.g., organization-specific application data, organization-common application data, customer data, FFX, HBase, etc.) and/or its respective application services (e.g., organization-specific application services, organization-common application services, customer applications, mobile aps, cloud-based applications, backend program logics, etc.) that need to be migrated from a source system instance to a target system instance as part of an organization migration (or customer migration). The migration orchestration engine can implement a plug-and-play framework that allows different engineers respectively responsible for different components to develop, maintain, test and/or experiment respective migration specific code (for executing respective migration specific actions or migration steps) to be executed for different state transitions (e.g., different stages, different phases, etc.) throughout the course of an organization migration.

The plug-and-play framework implemented by the migration orchestration engine allows an engineer of a specific component to add, update, remove and/or maintain migration specific code for the specific component, without needing to become an expert on how organization migrations are architected and performed in detail, how all components are integrated and bound to the migration logic of the organization migrations in detail, and so forth. Thus, the plug-and-play framework is operable and scalable with a variety of systems of record (SORs), even if any of these SORs may implement special component-specific features and handlings. In some embodiments, migration component objects representing to-be-migrated components can be registered in a migration component registry, and then automatically executed by the migration orchestration engine from the migration component registry. Additionally, optionally or alternatively, in some embodiments, migration steps of a specific component for an organization, which have been created by engineer(s) for the specific component, can be registered in a migration step registry, and then automatically executed by the migration orchestration engine (or a migration step engine operating in conjunction with the migration orchestration engine) from the migration step registry. As used herein, migration steps in an organization migration refer to migration specific actions (or pre-migration steps) that are executed before a selected time window of the organization migration, migration specific actions (or migration steps) that are executed during the selected time window of the organization migration, and/or migration specific actions (or post-migration steps) that are executed after the selected time window of the organization migration.

The migration orchestration engine supports relatively high resiliency in dealing with issues and failures of migration steps in existing and/or newly added components (or features therein) for an organization to be migrated. If one or more migration steps of a specific component fail or experience abnormality, the entire organization migration can still proceed in many operational scenarios, without incurring a relatively large number of manhours to repeatedly diagnose, resolve and fix various issues and failures in various components in the organization migration. The cost savings in manhours and associated computing resources are even more significant, as more components (or features therein) and SORs are added into, or hosted by, system instances of datacenters.

In some embodiments, the migration orchestration engine implements a progress tracking mechanism for each component (or each migration step thereof) to report its individual progress. Through this mechanism, failed and/or stalled migration steps are recorded and presented to operators. The operators can skip one or more migration steps to allow the organization migration to complete if the failed or stalled migration steps are deemed non-critical, or to notify/contact engineers/experts to find an alternative (e.g., expedient, temporary, etc.) solution if any in relation to the failed or stalled migration steps. Additionally, optionally or alternatively, the operators can verify through the migration user interface whether a migration step (including but not limited to any pre-/post-migration step) has completed, can detect through the migration user interface whether a migration step (including but not limited to any pre-/post-migration step) has not completed (e.g., not yet failed, etc. In some embodiments, migration steps in the selected time window is prevented from being performed if some or all of pre-migration steps have not been completed successfully and have not been skipped by the operators. Additionally, optionally or alternatively, a migration step (including but not limited to any pre-/post-migration step) can be retried (e.g., by an operator, etc.) for a finite number of times or indefinitely. If failed pre-migration steps are skipped, the subsequent or other migration steps can continue to be enqueued/performed in the organization migration. Individual and collective completion statues of migration steps (including but not limited to pre-/post-migration steps) may be persisted and may span over one or more restarts of migration application servers, one or more restarts of core applications, system, database, networking functions underlying the migration application servers. Some or all histories of statuses/progresses of completed/skipped migration steps (including pre-/post-migration steps) in the organization migration can be logged.

Migration steps may have dependency relationships. The migration orchestration engine allows a migration step (or depending migration step) that depends on other migration step(s) (or depended migration step(s)) to query statuses of the other migration step(s) and specify conditional execution of the migration steps upon specific statuses of the other migration steps(s). The migration orchestration engine further allows migration steps that do not have dependencies or that have met their specific dependencies to execute in parallel or in any order. Thus, under techniques as described herein, migration steps do not need to be processed serially. Even if a component or migration step may take a long time to execute, every other migration step that does not depend on the component or the migration step is not held from being executed. This leads to a significantly shorted downtime for users and/or customers of organizations in organization migrations.

Additionally, optionally or alternatively, the migration orchestration engine can implement pre-/post-migration step automation that allows migration steps (or migration specific actions) to be executed out of band at a specific (time) offset from the selected time window (or migration time window) in which access to application data and application services by users/customers of the organization are impacted, limited or prevented.

In some embodiments, a migration scheduler operating with the migration orchestration engine is implemented as a cron job. Migration steps to be executed in the pre-/post migration step automation outside the selected time window and migration steps to be executed in the selected time window may be respectively triggered by different cron jobs (or different incarnations) of the migration scheduler at different time points. For example, pre-migration steps (including but not limited to purging previously performed organization migrations, killing jobs or processes/threads/operations/steps before the shutdown window, migration steps or migration specific actions kicked off at a specified time period before the migration window begins such as one week before, or four weeks before, one hour before, etc.) and post-migration steps (including but not limited to copying read-only login history, migration steps or migration specific actions automatically kicked off after an organization in an organization migrated is activated, a post-migration step related to a previously performed pre-migration step, etc.) can automatically begin execution at specific (time) offsets (e.g., from a couple hours to a few weeks, etc.) before or after the selected time window. The (time) offsets can be specified as a part of a request for the organization migration, and/or automatically determined by the migration scheduler. The migration scheduler can be started as cron jobs at various time points to cause the migration orchestration engine to automatically query and automatically execute pre-migration steps, migration steps and/or post-migration steps at respective time points with no or little human intervention. As noted previously, even if some of these migration steps fail or stalled, these migration steps can be individually retried or skipped by operators.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 FUNCTIONAL OVERVIEW

FIG. 1A illustrates an example overall organization migration framework 100 for migrating organizations hosted in a computing system. Example computing systems that implement the organization migration framework (100) may include, but are not necessarily limited to: any of: a large-scale cloud-based computing system, a system with multiple datacenters, multitenant data service systems, web-based systems, systems that support massive volumes of concurrent and/or sequential transactions and interactions, database systems, and so forth. Various system constituents may be implemented through software, hardware, or a combination of software and hardware. Any, some or all of these system constituents may be interconnected and communicated directly, or through one or more networks 120.

In some embodiments, the computing system that hosts the organizations may comprise a plurality of datacenters such as 112-1, 112-2, 112-3, etc., which may be located at the same or different geographic locations such as the same or different continents, the same or different countries, the same or different states, the same or different regions, and so forth.

Each data center may implement a set of system instances to host respective organizations. These organizations may contract with the owner of the computing system such as a multi-tenant computing system to host their respective (e.g., organization-specific, organization-common, etc.) application data, to provide their (e.g., organization-specific, organization-common, etc.) application services to their respective users and/or customers. Examples of application data may include, but not necessarily limited to only, organization-specific application data, organization-common application data, application configuration data, application data, application metadata, application code, etc., specifically generated or configured for (e.g., organization-specific, organization-common, etc.) application services of an individual organization.

As used herein, the term "organization" may refer to some or all of (e.g., complete, original, a non-backup version of, a non-cached version of, an online version of, original plus one or more backup or cached copies, an online version plus one or more offline versions of, etc.) application data of an organization hosted in the computer system and application services of the organization based at least in part on the application data.

As illustrated in FIG. 1A, each datacenter (e.g., 112-1, 112-2, 112-3, etc.) may comprise a set of one or more system instances. A first datacenter 112-1 comprises first system instances 110-1-1, 110-1-2, etc.; a second datacenter 112-2 comprises second system instances 110-2-1, 110-2-2, etc.; a third datacenter 112-3 comprises third system instances 110-3-1, 110-3-2, etc.

Each system instance (e.g., 110-1-1, 110-1-2, 110-2-1, 110-2-2, 110-3-1, 110-3-2, etc.) in the hosting computing system can host up to a maximum number of organizations such as 5,000 organizations, 10,000 organizations, 15,000+ organizations, etc. As illustrated in FIG. 1A, the system instance (110-1-1) in the datacenter (112-1) may host a first organization 114-1 and a second organization 114-2, among others; the system instance (110-1-1) in the datacenter (112-1) may host a third organization 114-3, among others.

The migration framework (100) can be used to provide reliable, flexible and scalable organization mobility (e.g., capability to perform mass organization migration, etc.) in the computer system. In some embodiments, organization migrations can be performed fully automatically. In some embodiments, a migration user can choose to specify and perform a (e.g., large, etc.) a part of an organization migration automatically with some manually performed migration steps (or migration specific actions). Statuses of manually performed migration steps (including but not limited to some heavy jobs or long-lasting operations) can be automatically incorporated and taken into account by a schedule engine as described herein while the automatically performed part of the organization migration are being scheduled, enqueued and performed automatically. Thus, the organization migration framework (100) can be used to avoid a manual, lengthy, complicated organization migration process that relies on relatively heavy cross-discipline involvement and cooperation from different personnel and teams over a relatively long time period such as months to plan, enqueue, execute, monitor, activate, rollback, etc.

A migration user such as an operator, an administrator, an authorized user, a designated user, and so forth, can use a migration user device 118 to enter or send a request for an organization migration to a migration scheduler 102 through a migration user interface. The migration user device (118) may be operatively linked to, and communicate with, the migration scheduler (102) through one or more networks (e.g., 120, etc.) or via a local data connection.

Upon receiving the request for the organization migration, the migration scheduler (102) can automatically schedule the requested organization migration to be automatically (e.g., fully automatically, automatically with manual steps specified or performed by a migration user, etc.) executed at least in part through a preparation time window, a downtime window, etc., selected for the organization migration. For the requested organization migration, the migration scheduler (102) may identify a specific organization (e.g., the first organization (114-1), etc.) to be migrated, a source target instance (e.g., the system instance (110-1-1) in the first datacenter (112-1), etc.), a target system instance (e.g., the system instance (110-2-1) in the second datacenter (112-2), etc.), the preparation time window (e.g., a start time, an end time, etc.), the downtime window (e.g., a start time, an end time, etc.), migration configuration data, any commands and/or operational parameters set forth for the requested organization migration, etc. Some or all of the foregoing may be specified in the request for the organization migration. Some or all of the foregoing may be obtained from the source and target system instances for the organization migration. Some or all of the foregoing may be stored as migration configuration data for the requested organization migration in a migration data store 108 in the migration scheduler (102).

At various appropriate time points, the migration scheduler (102) operates with a migration orchestration engine 154 to carrying out the migration specific actions (or migration steps including but not limited to pre-migration steps and/or post-migration steps) for the requested organization migration in the selected preparation time window, the selected downtime window, etc. These migration specific actions automatically (e.g., fully automatically, automatically with manual migration steps specified or performed by a migration user, etc.) move application data and application services of the organization from the source system instance (e.g., 110-1-1, etc.) to the target system instance (e.g., 110-2-1, etc.), thereby causing the organization to automatically migrate from the source system instance (110-1-1) or the first datacenter (e.g., 112-1, etc.) to the target system instance (110-2-1) or the second datacenter (e.g., 112-2, etc.) with no or minimal/minor human intervention (e.g., in normal operational scenarios, etc.).

Additionally, optionally or alternatively, as a part of the organization migration, the migration specific actions automatically (e.g., fully automatically, automatically with a manual part specified or performed by a migration user, etc.) performed under techniques as described herein can cause system configuration data, system data, system metadata, system code, etc., to be (e.g., fully automatically, with minimal manual input, etc.) generated and deployed in connection with the target system instance (110-2-1) and/or the target datacenter or the second datacenter (112-2) in the present example. As used herein, system configuration data, system data, system metadata, system code, etc. refers to system-level data and/or system-level services used to store, access, or manipulate the application data for the organization, to enable the application services, etc.

2.1. Coordinating Organization Migrations with Scheduler

Figure 1B:
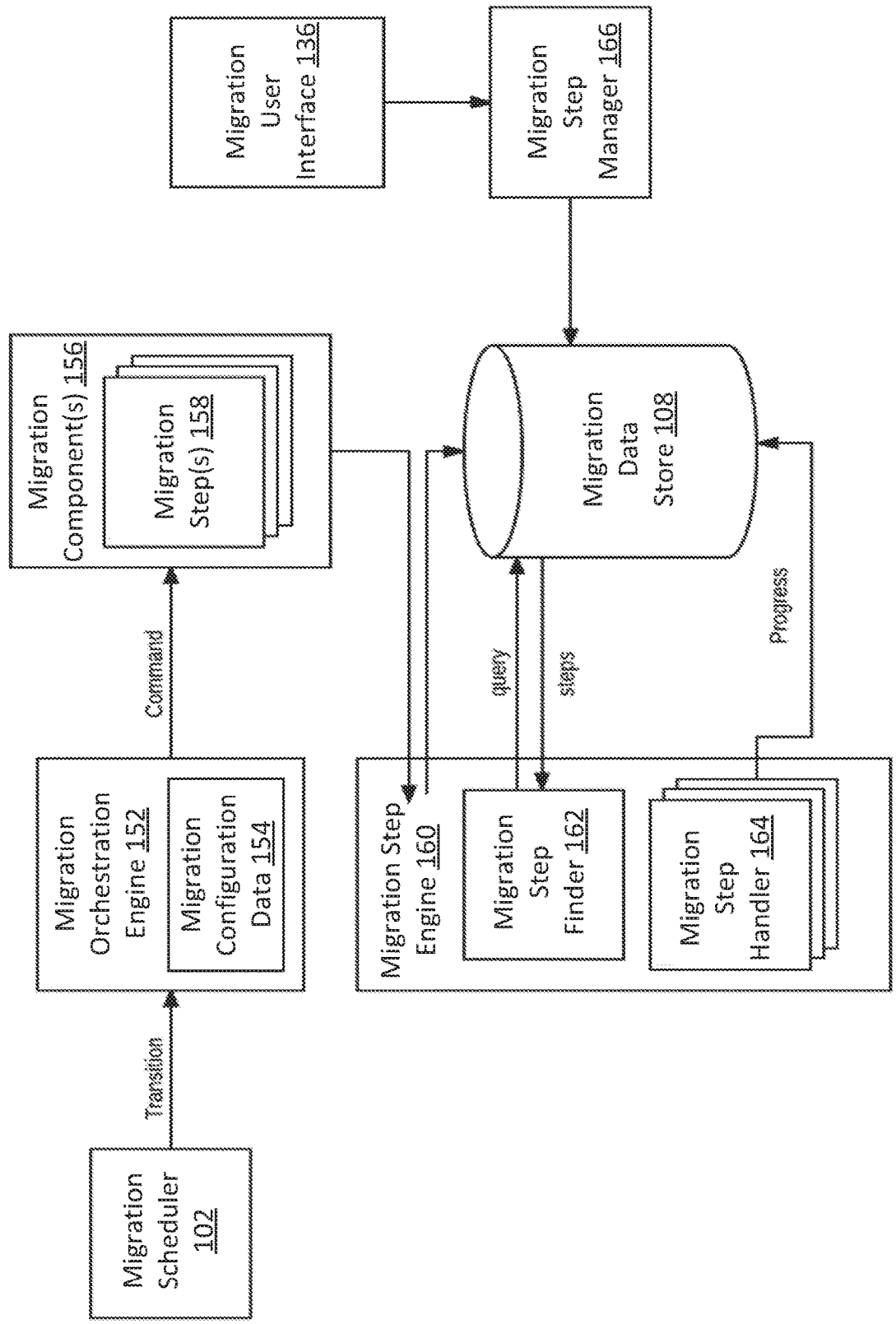
FIG. 1B and FIG. 1C illustrate an example system configuration for organization migrations.

FIG. 1B illustrates an example system configuration for organization migrations that comprises a migration scheduler (e.g., 102, etc.), a migration orchestration engine (e.g., 152, etc.), and one or more program objects (e.g., processes, threads, objects, classes, interfaces, instantiations, implementers, methods, etc.) operating in conjunction with the migration scheduler (102) and the migration orchestration engine (152). The program objects may include, but are not limited to, any of: one or more migration component objects (or migration components for simplicity reasons) 156, a migration step engine 160, a migration user interface 136, a migration step manager 166, and so forth.

In contrast with a monolithic system containing all heavy lifting potentially convoluted program logic for performing organization migrations as under other approaches, the system configuration as illustrated in FIG. 1B (e.g., of the organization migration framework (100), etc.) provides a highly efficient, scalable, extensible infrastructure for orchestrating and performing multiple different organization migrations, while leaving implementation details including but not limited to migration steps for each to-be-migrated component (or system of record) in a to-be-migrated organization to engineers and experts for each such component. The system configuration provides an infrastructure that can be efficiently scaled up to a relatively large number (e.g., 100,000, etc.) of organization migrations with (e.g., optimal, etc) minimized downtime and with no or minimal human intervention, as the datacenters and the system instances therein continue to scale up, and/or as organization-specific and organization-common application data and application services of respective organizations continue to spread into more and more (e.g., disparate, etc.) types of systems of records, system instances, databases, datacenters, and/or as engineering teams continue to develop respective products and features for different components (or systems of record) and make new releases of these products and features.

The infrastructure supports relatively stable and well-defined interfaces (e.g., application programming interfaces or APIs, class interfaces, migration component and/or step registries etc.) comprising (e.g., abstract, default, skeleton, etc.) methods, data items, data types, and so forth, to be specifically implemented by the engineers for each migration component. The infrastructure also provides or implements a migration component and/or step registration mechanism for registering to-be-migrated components and/or migration steps for the components. The infrastructure can support fault tolerance and relatively high resilience in organization migrations. For example, non-fatal errors in migration specific actions or steps and/or stalled operations/steps can be recovered or resolved by skipping or retrying these actions, operations or steps for a limited number of times or indefinitely and/or by implementing alternative solutions (e.g., workarounds, manual operations, temporary solutions, expedient solutions, etc.). The infrastructure can be used to collect (e.g., realtime, near-realtime, etc.) progresses of migration specific actions or steps in any given organization migration and present an up-to-date consistent view and/or a history of the state of the organization migration. In addition, the infrastructure can be used to support parallel (or in any order) executions of multiple different to-be-migrated components and/or multiple different independent migration specific actions or steps in a single to-be-migrated component or multiple different to-be-migrated components, so long as any dependency relationships between migration components and/or between migration steps are respected or maintained. Additionally, optionally or alternatively, the infrastructure can be used to migrate application data from an underlying database of a first type (e.g., an Oracle database, etc.) in a source system instance (or place of deployment (POD)) into a replacement database of a different type (e.g., a Sayonara-based database, etc.) in a target system instance.

Each migration component in the one or more migration components (156) corresponds to a to-be-migrated component (or system of record) in an organization to be migrated in an organization migration, and encapsulates respective migration steps 158 (including any applicable pre-migration and/or post-migration steps) for the to-be-migrated component.

To support pre/post migration step automation, each migration component as described herein can also include respective pre-migration steps and post-migration steps for the to-be-migrated component (or the systems of record) in the organization. In a non-limiting implementation example, a single interface may be used to implement or specify a pre-migration step to be executed at a (time) offset before a selected time window (e.g., a shutdown window, etc.), a migration step to be executed during the selected time window, or a post-migration step to be executed at a (time) offset after the selected time window. In some embodiments, the pre-migration and post-migration steps share almost everything with the (e.g., normal) step, other than specifying the (time) offsets before or after the selected time window. A time offset as described herein may be any of: an absolute time value (e.g., a system time, a wall clock time, etc.), a relative time value (e.g., from a selected time window, from a shutdown window, from another step or action, etc.), a logical time value (e.g., a sufficiently large incrementing integer, etc.), a time-dependent sequence number representing a logical time value, and so forth.

A migration step in the migration steps (158) for each migration component in the migration components (156) can specify (e.g., using a static enum, etc.) whether this step is to be run on the source system instance, the target (or destination) system instance, or both. The migration step can also specify a (time) offset (e.g., positive or negative, from the selected time window or the migration time window, a (signed) long value, etc.) at which the step is to be invoked/executed. The migration step engine (160) can be implemented to optimize executing the migration step, for example try to execute the migration step as close to (Window Start Time+Offset) as possible, where "Window Start Time" denotes the start time of the selected time window and "Offset" denotes the (time) offset as specified in the migration step. A migration step implementer (e.g., an instantiation of a class that implements specified migration step interfaces, etc.) can further implement a report method (e.g., a report function, an abstract function in an interface to be implemented by engineers responsible for the to-be-migrated component, etc.). The report method reports the progress of the migration step while being executed, including but not limited to successful completion or failure. The progress of the migration step as reported by this method can be persisted (e.g., stored in an in-memory data store, stored in a data repository such as the migration data store (108), etc.) to allow consumption (e.g., read, etc.) by operators and other program objects including but not limited to a migration step finder 162 in the migration step engine (160) that may try to repeat the migration step in the next cron job. What are to be included and executed in the migration step can be designed, implemented and tested by the engineers for the to-be-migrated component. Program logic for the migration step can be implemented in an "execute" method of the migration step (or an implementer object implementing the migration step interfaces). In some embodiments in which the migration step depends on one or more depended migration steps, the program logic of the migration step may implement dependency-related processing (e.g., based at least in part on expert input and/or domain knowledge in specific components or migration steps, etc.) that checks whether any reports of progresses generated by reported methods of the depended migration steps are available (e.g., have been written or persisted, etc.) and determined (e.g., based on the reports of progresses from the depended migration steps, etc.) whether the depended migration steps have been executed.

The migration step engine (160) may be implemented as a program object responsible for executing migration steps (e.g., 158, etc.) of each to-be-migrated component in the migration components (156). For example, the migration step engine (160) may decide whether a migration step is to be executed immediately or whether the migration step is to be stored in a data storage facility for delayed execution.

In various embodiment, any of some or all combinations of a plurality of data storage facilities (e.g., the migration data store (108), etc.), a plurality of data representations, etc., including but not limited to message-queue-based data storage facilities and/or representations, data-relational-object-based data storage facilities and/or representations, cookie-based data storage facilities and/or representations, etc., can be used to represent or store migration configuration data portions for a migration component and/or any migration step in the migration component. By way of example but not limitation, migration steps for delayed execution can be persisted in a data storage facility or a data repository such as the migration data store (108).

The migration step finder (160) may be implemented (e.g., as a program object, as a class object, etc.) with the migration step engine to query the migration data store (108) for migration steps that are due for execution. To determine whether a migration step is due for execution, the migration step finder (160) may take into account, or make provision for, any time delays, time related to generating progress reports including but not limited to completion, any previous failures of the migration step, and so forth. For a migration step with previous failures, the migration step finder (162) may allocate additional time for possible retries in case of encountering failures again. Additionally, optionally or alternatively, the migration step finder (162) may skip a migration step if so instructed or indicated by the operators (e.g., an authorized user or a support personnel for the to-be-migrated component, etc.).

The migration step engine (160), or the migration step finder (162) therein, can create or instantiate a migration step instance 164 (or step executor) to execute a (e.g., single, each, etc.) migration step that is due for execution. Each migration step can be executed independently (e.g., in parallel, in any order, in a step execution order that respects or complies with dependency relationships between or among the migration steps, etc.) by a corresponding migration step executor (e.g., 164, etc.). The migration step instance (164) implements program logic responsible for logging (e.g., system logs, traces, etc.), alerting (e.g., a migration step, a component, etc.) on completion of a migration step's completion of execution, indicating whether the migration step is executed successfully or failed, logging of successes/errors in running or executing pre-/post-migrations steps, and so forth.

Additionally, optionally or alternatively, the migration step instance (164) may implement program logic responsible for detecting whether the migration step has stalled in execution and deal with such situation appropriately (e.g., setting a timer in advance to be fired later for checking any subsequent stalling condition, etc.). Additionally, optionally or alternatively, a (e.g., fixed, up to a maximum number, etc.) thread pool of migration step instances, may be started in advance to avoid cold starting or unconstrained/uncoordinated thread generation; a migration step instance (e.g., 164, etc.) to execute a specific migration step can be selected from the thread pool to be initialized with specific implementation of the specific migration step and execute the specific migration step that is due for execution.

The migration step manager (166) may be implemented as a program class/object to support or allow consumptions/manipulations of progresses of migration steps by interested program classes/objects (e.g., processes, threads, objects, classes, interfaces, instantiations, implementers, methods, etc.) that are interested in such progresses. For example, a migration user interface 136 may be interested in querying, through the migration step manager (166), the progresses of the migration steps in order to present the progresses to an operator and then obtain user input from the operator with respect to any failures or issues in relation to these migration steps. Depending migration steps and/or the migration step finder (162) may also be interested in querying, for example through the migration step manager (166), the progresses of the migration steps in order to determine whether any depended migration steps have completed successfully or failed, or whether any migration steps have been skipped by operators, and so forth. In some embodiments, an operator can use the migration UI (136) to write a progress (line) specifying that a migration step has been skipped by the operators. The writing of the progress of the migration step by the operators not only allows other progress consumers (e.g., depending migration steps, the migration step finder (162), etc.) to be informed of the operator's decision that this migration step has been skipped, but also allows an organization migration to proceed (e.g., to proceed to the next transition, etc.) despite the migration step not having been successfully completed.

2.2. Migration Stages/States of Organization Migrations

In some embodiments, in response to determining that migrations steps of an organization migration are due for execution in a selected time window (e.g., a shutdown window, etc.), the migration orchestration engine (152) performs a lockout action (e.g., read-only access maybe permitted in some embodiments, etc.) at an organization-wide level to prevent users and/or customers of an organization to be migrated in the organization migration from accessing (e.g., writing, modifying, etc.) application data and/or application services of the organization.

In some other embodiments, in response to determining that migrations steps of an organization migration are due for execution in a selected time window (e.g., a shutdown window, etc.), the migration orchestration engine (152) may invoke each migration component in the migration components (156) to perform a lockout action (e.g., read-only access maybe permitted in some embodiments, etc.) at a component level to prevent users and/or customers of an organization to be migrated in the organization migration from accessing (e.g., writing, modifying, etc.) application data and/or application services of the component (or the system of record) in the organization.

Figure 2A:
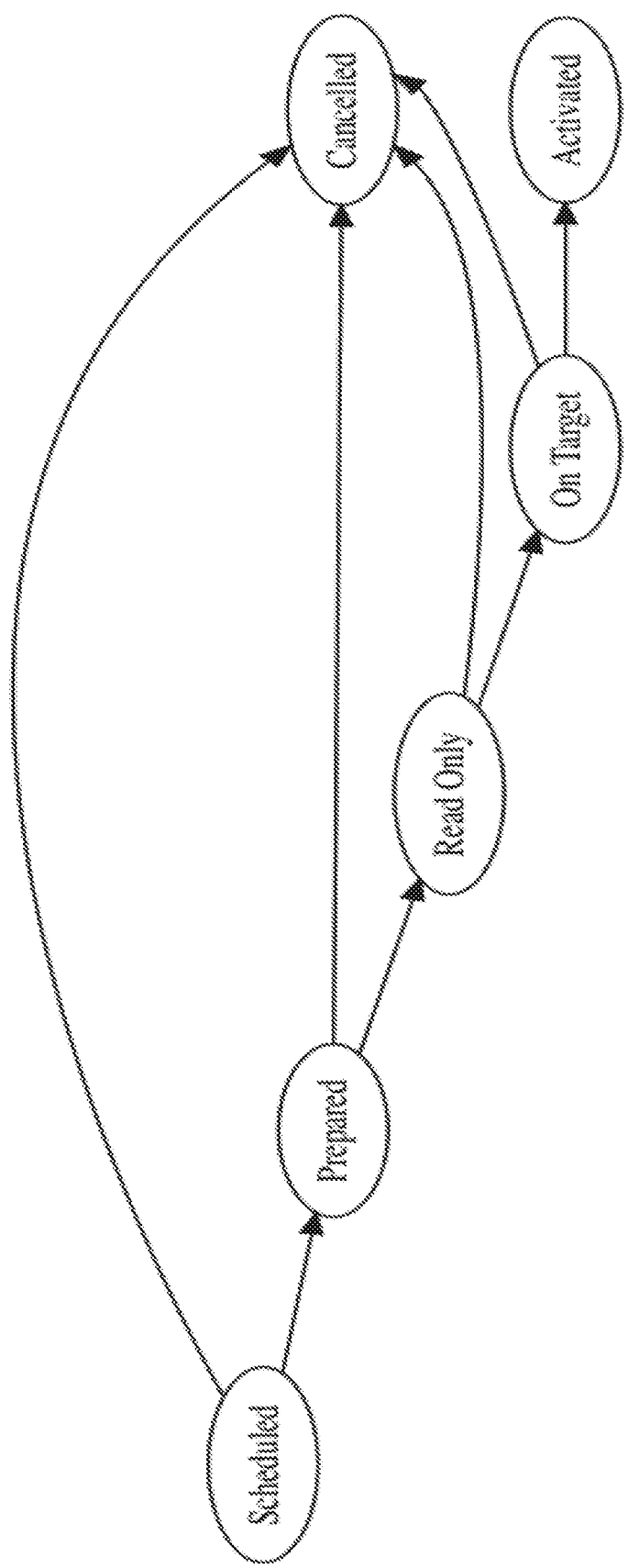
FIG. 2A and FIG. 2B illustrate example migration stages in an organization migration.
Figure 2B:
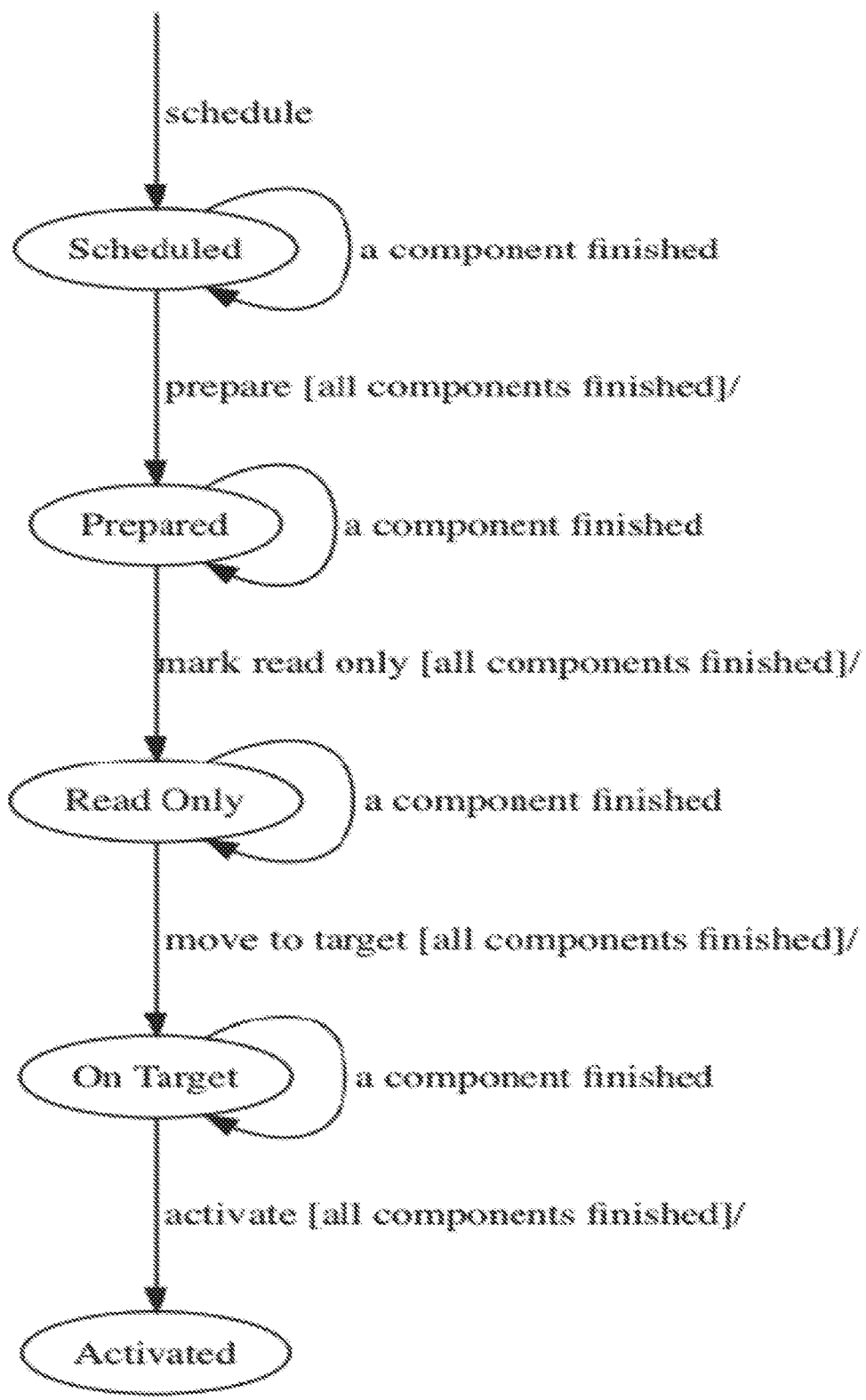

FIG. 2A and FIG. 2B illustrate example migration stages in an organization migration. A data flow cycle between source and target system instances in the organization migration can be described based on the different migration stages the organization migration has to go through.

As illustrated, the organization migration may go through (e.g. sequentially, in the specified order, etc.) the migration stages as follows: a first stage "Scheduled" to a second stage "Prepared/Processed" to a third stage "Read Only" to a fourth stage "On Target" to a fifth stage "Activated". These migration stages define or specify time points (or transition points) in the organization migration at which time points migration specific actions or steps may become due for execution. Depending on how these migration stages and/or the migration specific actions or steps are implemented, the migration specific actions or steps can be performed while entering a migration stage, being in a migration stage, or exiting a migration stage.

As illustrated in FIG. 2A, a directed graph comprising nodes and edges each of which leads from one node to another may be used to represent the migration stages of the organization migration. Each migration stage in the data flow lifecycle (e.g., the first migration stage through the fifth migration stage, etc.) may be represented as a node in the directed graph. In addition, a "Cancelled" node may be included in the directed graph to denote a cancelled state for the organization migration.

In a successfully performed organization migration as illustrated in FIG. 2B, initially, a "schedule" transition—for example, in response to receiving and successfully validating a request for an organization migration—causes the organization migration to enter the "Scheduled" stage. Migration steps (or pre-migration steps) of all to-be-migrated components in the organization migration for the "Scheduled" stage may be performed, for example, in parallel, in series, or in part parallel in part series. When all components finish their respective processing for the "Scheduled" stage, a "prepare" transition causes the organization migration to leave the "Scheduled" stage and enter the "Prepared" stage. Migration steps (or pre-migration steps) of all to-be-migrated components in the organization migration for the "Prepared" stage may be performed, for example, in parallel, in series, or in part parallel in part series. When all components finish their respective processing for the "Prepared" stage, a "mark read only" transition causes the organization migration to leave the "Prepared" stage and enter the "Read Only" stage. Migration steps of all to-be-migrated components in the organization migration for the "Read Only" stage may be performed, for example, in parallel, in series, or in part parallel in part series. When all components finish their respective processing for the "Read Only" stage, a "move to target" transition causes the organization migration to leave the "Read Only" stage and enter the "On Target" stage. Migration steps (or post-migration steps) of all to-be-migrated components in the organization migration for the "On Target" stage may be performed, for example, in parallel, in series, or in part parallel in part series. When all components finish their respective processing for the "On Target" stage, a "activate" transition causes the organization migration to leave the "On Target" stage and enter the "Activated" stage. In some embodiments, some or all of the "Read Only," "On Target" and "Activated" stages may be performed in a selected time period such as a scheduled shutdown window, a scheduled maintenance time window, and so forth.

In some embodiments, the migration orchestration engine (152) or its subordinate program classes/objects implement/create a finite state machine (FSM) based at least in part on the migration stages as illustrated in FIG. 2A and FIG. 2B, including but not limited to transitions between these migration stages. A transition as described herein may refer to an action triggered by an event to leave the current state and to enter the next state following the current state.

The FSM helps communicate a temporal ordering of the migration stages and transitions. Components or systems of record in the to-be-migrated organization can rely on this temporal ordering to structure their respective specific migration of application data and application services. For example, in dual-phase migrations, the transition relating to the "Prepared" migration stage (or the corresponding state in the FSM) can be used to do a base copy of their respective application data and/or application services, while the transition relating to the "On Target" migration stage (or the corresponding state in the FSM) can be used to copy remaining changes of their respective application data and/or application services. Components in these migrations can be sure that the "Prepared" state or the transition relating to the "Prepare" state precedes the "On Target" state or the transition relating to the "On Target" state.

In a non-limiting implementation example, actions in this state machine begin performance when in a new state. The state machine as implemented in the migration orchestration engine (152) waits in the new state for all the to-be-migrated components to finish their respective migration steps (or migration specific actions) for the new state before transitioning to the next state (immediately following the new state). A transition from one state to the next can be relatively complicated, and can involve asynchronous processing of the migration steps of the multiple to-be-migrated components.

Additionally, optionally or alternatively, in some embodiments, additional states may be implemented in a state machine for organization migrations to simplify transitions. For example, when in the "Scheduled" state, a "prepare" event can be used to cause a transition from the "Scheduled" state to an additional "Waiting to Be Prepared" state (or something similar). While this could simplify the "Scheduled" state, the addition of the new "Waiting to Be Prepared" state would increase complexity to the state machine as more states are implemented.

To simplify the design of the organization migration framework (100 of FIG. 1A), a single point of scheduling control with respect to transitions between different states in the state machine may be implemented. In a non-limiting implementation example, the migration scheduler (102) can focus on when to move the application data and/or application services of the organization in the organization migration, while the migration orchestration engine (152) can focus on how to move application data and/or application services of an organization in an organization migration. All decisions on state transitions can be driven through the single point of scheduling control. The migration orchestration engine (152) can (e.g., only, etc.) transition from a first state to a second state immediately following the first state when the following conditions are met:

1. All to-be-migrated components are finished their respective processing (or their respective execution of migration steps with no non-skippable migration steps in failure) for the first state.
2. The migration scheduler (102) allows transitioning from the first state to the second state to happen.

The migration scheduler (102) can be implemented to determine or identify time points (in an organization migration) that may or may not be known to the migration orchestration engine (152). Example time points that can be determined or identified by the migration scheduler (102) may include, but are not necessarily limited to only: a time point when the organization migration is scheduled, a time point when a selected time window (or a shutdown window, a downtime period, etc.) is scheduled, a time point when pre-migration steps can be appropriately performed, and so forth.

In some embodiments, the migration orchestration engine (152) cannot transition from the "Prepared" state to the "Read Only" state autonomously without first receiving a permission from the migration scheduler (102) to do so, as the selected time window (or a downtime window) may need to be scheduled by the migration scheduler (102) to fall within a maintenance window such as weekend, wee hours in the morning, non-working hours of the organization, etc., as the migration scheduler may have access to information about (e.g., future, upcoming, pre-scheduled, etc.) maintenance windows in which selected time windows (or migration time windows) can be scheduled.

The migration orchestration engine (152) and the migration scheduler (102) can be communicatively coupled and can coordinate with each other before a transition between two states can occur over unidirectional and/or bidirectional communications.

In some operational scenarios, the migration orchestration engine (152) can complete its work (e.g., by way of executing pre-migration steps of all to-be-migrated components, etc.) before the selected time window (or scheduled downtime). Once within the selected time window, the migration scheduler (102) can drive a transition to the next state (e.g., the "Read Only" state, the "On Target" state, etc.). In some operational scenarios, the selected time window (or the scheduled downtime) can occur before the migration orchestration engine (152) can complete its work (e.g., not able to execut all non-skippable migration steps of all to-be-migrated components, etc.) for the current state before the next state (e.g., the "Read Only" state, the "On Target" state, etc.). If the migration orchestration engine (152) has not finished all the work for the current state, once such work is done, the migration orchestration engine (152) can notify the migration scheduler (152) over bidirectional communications so that the migration scheduler (152) can decide when to drive the transition to the next state and notify the migration orchestration engine (152) of the transition over the same bidirectional communications.

Additionally, optionally or alternatively, transitions may occur with (e.g., only, etc.) one-way communications between the migration orchestration engine (152) and the migration scheduler (102). For example, the migration orchestration engine (152) can poll the migration scheduler (102) periodically until the current time of such polling is within the selected time window (or the scheduled downtime). In some embodiments, the migration orchestration engine (152) may have access to information about states of all organization migrations implemented in state machines as described herein; for each organization migration, the migration orchestration engine (152) can poll the migration scheduler (102) to determine whether a transition is allowed to proceed.

Additionally, optionally or alternatively, the migration scheduler (102) can communicate with the migration orchestration engine (152) similarly in one-way communication links/paths.

2.3. Migration Configuration Data

Different (sets of) migration configuration data can be generated for different organization migrations to cater to different use cases. Example organization migrations may include, but are not necessarily limited to only, any of: migrating application data stored in an underlying Oracle database to another Oracle database, migrating application data stored in an underlying Oracle database to a Sayonar-based database, migrating application data stored in an underlying Sayonar-based database to an Oracle database, migrating application data stored in an underlying Sayonar-based database to a Sayonar-based database, and so forth. It should be noted that some or all of techniques ascribed herein for organization migration is agnostic to database technologies. In some embodiments, underlying data replication differences and/or underlying data access differences can be handled in isolated program objects through abstraction.

The migration configuration data can be used to identify or encapsulate (e.g., all, etc.) the to-be-migrated components in a specific organization migration and/or in a specific type of organization migrations. Additionally, optionally or alternatively, the migration configuration data can be made persistent (or stored) with any of in-memory or other types of data stores to facilitate access to the migration configuration data by other processing entities involved in organization migrations.

In some embodiments, commands and/or operational parameters in the migration configuration data for a specific to-be-migrated component can be passed as one or more migration configuration data portions to a migration component (object) in the migration components (156 of FIG. 1B) that are to be created and/or registered for representing (migration work of) the specific to-be-migrated component.

The migration scheduler (102) may be implemented based on a data-driven approach under which the migration scheduler (102) schedules and drives a specific organization migration based (e.g., entirely, substantially, etc.) on specific migration configuration data generated/defined for the specific organization migration. In some embodiments, to schedule and drive the specific organization migration, the migration scheduler (102) does so with the specific migration configuration data, which identifies all the to-be-migrated components and specifies or encapsulates how the specific organization migration progresses, how the components are configured, and so forth.

The migration orchestration engine (152) uses the migration configuration data to set up the specific organization migration and make appropriate calls in relation to the migration components (156). Additionally, optionally or alternatively, the migration orchestration engine (152) can use the migration configuration data to determine what to-be-migrated components are in the specific organization migration that previously experienced failures and/or reconstruct its world view if there is a failure affecting migration application servers that implements some or all of the organization migration framework (100) or affecting any previously performed migration steps or any previously tries of the specific organization migration.

As noted, a state machine or directed graph may be used to represent states or stages of an organization migration as described herein. Under techniques as described herein, migration components (156) can process migration steps for transitions in parallel or in any order that respects underlying dependency relationships among the migration steps and/or among the migration components. Different migration components may take varying amounts of time to complete it respective migration steps. The migration orchestration engine (152) may remain in the current state and may not move into the next state until all migration components are finished with migration steps for the current state. The migration orchestration engine (152) can query the migration components (156), or can be notified by each migration component in the migration components (156) (e.g., in real time, in near real time, at the next cron job, etc.) when each such migration component completes its respective transition work (or migration steps for the current state). In addition, the migration orchestration engine (152) can coordinate with the migration scheduler (102) to determine when the transition to the next (organization migration) stage/state can occur, after each migration component in the migration components (156) completes its respective transition work for the current state.

State machines implemented with the migration orchestration engine (152) for organization migrations can be tied to, or correlated with, corresponding requests for these organization migrations. If an organization migration has been migrated successfully, or if the organization migration enters the "Cancelled" state, any further migrating the same organization creates a new organization migration, which may be initiated by a new or renewed request for the new organization migration.

The migration orchestration engine (152) can be implemented with various program logics, including but not necessarily limited to: program logics relating to any of the following:

1. Configuration—how a given organization migration is configured.
2. Registration—how the migration components (156) register themselves to be used by the migration orchestration engine (152).
3. Transitions between (migration) states—how each migration component in the migration components (156) performs its respective migration specific action(s) or migration step(s) as a result of a transition to a new state.
4. Progress—how feedback (e.g., progresses of any migration steps and/or any migration components, etc.) is reported back to the migration orchestration engine (152).
5. Dependencies—how a depending migration component and/or a depending migration step can depend on depended migration component(s) and/or depended migration step(s) before commencing or completing its own work.

In some operational scenarios, some if not all organization migrations may be running off of predefined, predictable, and tested configurations for organization migrations. These configurations may be set up and represented with one or more default profiles/sets of migration configuration data. These default profiles/sets of migration configuration data can be stored in a data storage facility (e.g., the migration data store (108), MQ-based, cookie-based, etc.) to provide consistency across some or all system instances, some or all system releases, some or all patch releases, etc. Customizations, enhancements and/or modifications may be made, for example to the default profiles on a source system instance (or POD) for testing purposes, for one off organization migrations, and so forth. Additionally, optionally or alternatively, customizations, enhancement and/or modifications for some or all of organization migrations can be made (e.g., permanently, etc.) in program code (e.g., relatively permanently, etc.) for some or all of the organization migration framework (100).

In some embodiments, a default profile/set of migration configuration data may be defined or specified in a template to be applied (with no or little modification) to a relatively large percentage of organization migrations. For example, a single-phase organization migration template may be applied to most single-phase organization migrations. A dual-phase organization migration template (which does base copy in a separate state/phase and then figure out data changes and ship the data changes in a later state/phase) may be applied to most dual-phases organization migrations. Different templates may include different components. An organization that is different in terms systems of record, features, sizes, performance characteristics, etc., may be specified with specific migration configuration or a specific template optimized for such organization.

The migration orchestration engine (152) can be implemented to support flexibility in modifying the migration configuration data, for example based at least in part on changing needs of some or all of organization migrations and to-be-migrated components in the organization migrations. In some embodiments, migration configuration data as described herein can be defined or specified using a standard format such as a JSON as illustrated in FIG. 3A. Example commands in the migration configuration data may include, but are not necessarily limited to only, database commands Example operational parameters in the migration configuration data may include, but are not necessarily limited to only, migration specific parameters (e.g., applicable to more than one to-be-migrated component, etc.), and component specific parameters (e.g., applicable to a component both in normal operations and in organization migrations).

As illustrated in FIG. 3A, a number of migration components such as "HBase", "FileForce", "DualPhaseOracle", etc., may be defined or specified in (e.g., a specific set of, etc.) migration configuration data for a specific to-be-migrated organization in an organization migration. For each of the migration components, a number of operational parameters (denoted as "options") can be defined or specified in the migration configuration data, For example, for the "HBase" migration component, an operational parameter denoted as "clustered" is set to a value of "true"; for the "FileForce" migration component, an operational parameter denoted as "enableLem" is set to a value of "true"; for the "DualPhaseOracle" migration component, an operational parameter denoted as "slice" is set to a value of "true".

Additionally, optionally or alternatively, more or fewer migration components and/or more or fewer operational parameters and/or different values of operational parameters may be defined or specified in migration configuration data as described herein for an organization to be migrated.

When a new organization migration is initiated, new migration configuration data is generated or supplied. Migration configuration data portion(s) for each migration component can be retrieved by the migration orchestration engine (102) from the new migration configuration data and passed along to each such migration component either one time through a (e.g., special, etc.) command/call or one but not all of the migration configuration data portion(s) each time when a command or call is made to each such migration component is made. Sending the migration configuration data portion(s) one time through a special command allows the migration component to handle and manage its respective migration configuration data portion(s) once passed along from the migration orchestration engine (102). On the other hand, since the migration configuration data can be made persistent for the migration orchestration engine (152), passing along the migration configuration data (without the special command but rather from one command to the next individually) can be done, albeit with some overheads.

Common to various implementations of migration-related logics as implemented by respective engineers for various to-be-migrated components is a component registration mechanism implemented by the migration orchestration engine (152) for registering migration components (e.g., 156 of FIG. 1B, etc.)—which 1-1 represent the to-be-migrated components—with the migration orchestration engine (152). In some embodiments, a simple interface as illustrated in FIG. 3B can be used to register each of the migration components (156) with, and to look up each of the migration components by the migration orchestration engine (152).

In some embodiments, at the startup of migration application servers (e.g., as a part of core applications or business-logic applications on a system instance or a datacenter, as a part of system services of a system instance or a datacenter, etc.) in the organization migration framework (100), the migration components (156) register themselves with the migration orchestration engine (152) in a migration component registry with their respective well-defined names that can be used by the migration orchestration engine (152) to reference (e.g., uniquely, unambiguously, distinctly, etc.) the migration components (156).

To effectuate a transition from a state (of an organization migration) to the next, as directed by the migration scheduler (102), the migration orchestration engine (152) can use a command pattern to delegate (component specific work of) the transition to each migration component in the migration components (156) that have been previously registered with the migration orchestration engine (152) in the migration component registry. This command pattern helps decouple each migration component from the migration orchestration engine (152).

More specifically, when a state transition is initiated by the migration scheduler (102), the migration orchestration engine (152) can figure out or determine what migration components (a subset of the migration components (156)) to call based on the migration configuration data for the newly entered state following the state transition. The determined migration components can then be looked up in the migration component registry. A command (e.g., an instantiation/object of a class "Command" as illustrated in FIG. 3C, etc.) encapsulating the transition (or specific migration configuration data portion related to the transition) can be created for, and sent to, each of the determined migration components, for example by invoking the method "execute ( . . . )" in an interface "Component" (as illustrated in FIG. 3C) implemented by each such migration component based at least in part on example program code as illustrated in FIG. 3D. Thus, the migration orchestration engine (152) may be (e.g., largely, completely, etc.) decoupled from an actual implementation of a respective migration work to be performed by a migration component for the newly entered state. The migration component, or its responsible engineer, can decide how to structure program code to carry out the respective migration work.

Under this approach, migration specific actions or migration steps can be relatively efficiently added in a migration component. The migration component can implement the relatively simple interface for registering itself with the migration orchestration engine (152). The migration component can also choose what commands to handle (e.g., by way of defining/specifying the commands in the migration configuration data, etc.). This also helps migration components focusing on implementing migration specific actions or migration steps rather than worrying about specifics of migration states and/or transitions between these states. In some embodiments, commands from the migration orchestration engine (152) to a migration component may be given with temporal ordering information such as an ordinal or an enum value (e.g., "Action" as illustrated in FIG. 3C, etc.) to identify to which specific transitions these commands pertain.

The migration orchestration engine (152) may be implemented to track progresses of migration components or its encapsulated migration steps in any given organization migration as described herein. The progresses of some or all of the migration components (156) can be used to determine or indicate an overall progress of the organization migration. In some embodiments, the organization migration framework (100) comprises or implements a progress tracking mechanism—which may be implemented with objects of a class "Progress" as illustrated in FIG. 3E and methods "isScheduled ( . . . )", "progress ( . . . )", and "progressFor ( . . . )", implemented by objects of classes "Component", "Transition", and "Component", or the encapsulated migration steps, to report/return progresses—for the migration orchestration engine (152) to obtain individual progresses from the migration components (156), and/or for the migration components (156) to report their respective progresses to the migration orchestration engine (152).

In a pull model, the migration orchestration engine (152) pulls progress from each migration component by making a call (e.g., implemented by the migration component, etc.) into the migration component. This allows the migration orchestration engine (152), for example, to make calls on a set schedule. The migration orchestration engine (152) may implement additional program logic to ensure that the calls are not blocked for long periods of time.

In a pull model, the migration orchestration engine (152) may not know whether a migration component has progress to report. As a result, the migration orchestration engine (152) can poll each migration component, for example at regular time intervals whether each such migration component has progress to report or not via a method as illustrated in FIG. 3G. Additionally, optionally or alternatively, each migration component can report a progress to the migration orchestration engine (152) when such progress is ready, as the migration component is likely in the best position to know whether there is any progress.

A push/pull combination model t may be used to alleviate issues where a migration component fails to report progress for a long period of time. Under this combined model, the migration orchestration engine (152) can try to retrieve progress by calling into the migration component. If the request for retrieving progress times out, exceptions can be thrown with errors returned.

Based on the progresses from some or all of the migration components (156), the migration orchestration engine (152) can make a relatively informed determination whether to cancel the organization migration, whether to continue the organization migration, whether to send alerts to operators to seek user input, and so forth.

As in the case of migration steps, migration components may have dependencies on other migration components. A migration component's transition to the next (organization migration) state may depend on another migration component's transition executing first.

The migration orchestration engine (152) can be implemented to support dependencies between or among the migration components (156). In some embodiments, individual migration components can register themselves independently. To facilitate dependency management, a migration component can register its dependencies on other migration components with the migration orchestration engine (152). The migration orchestration engine (152) can then build a dependency graph and execute component transitions based at least in part on the dependency graph (e.g., in combination of a state machine or directed graph for migration states/stages of the organization migration).

Additionally, optionally or alternatively, the migration orchestration engine (152) can expose state transition progress(es) of depended migration component(s) to a depending migration component, which can then query the state transition progress(es) of the depended migration component(s), and wait until the state transition progress(es) indicate that respective works of the depended migration component(s) has been completed for the current state before proceeding or transitioning the organization migration to the next state. In some embodiments, each migration component is given a well-defined and uniquely identifiable name for the migration component to be tracked or identified by their counterpart migration components or by the migration orchestration engine (152).

2.4. Example Organization Migrations

Figure 2C:
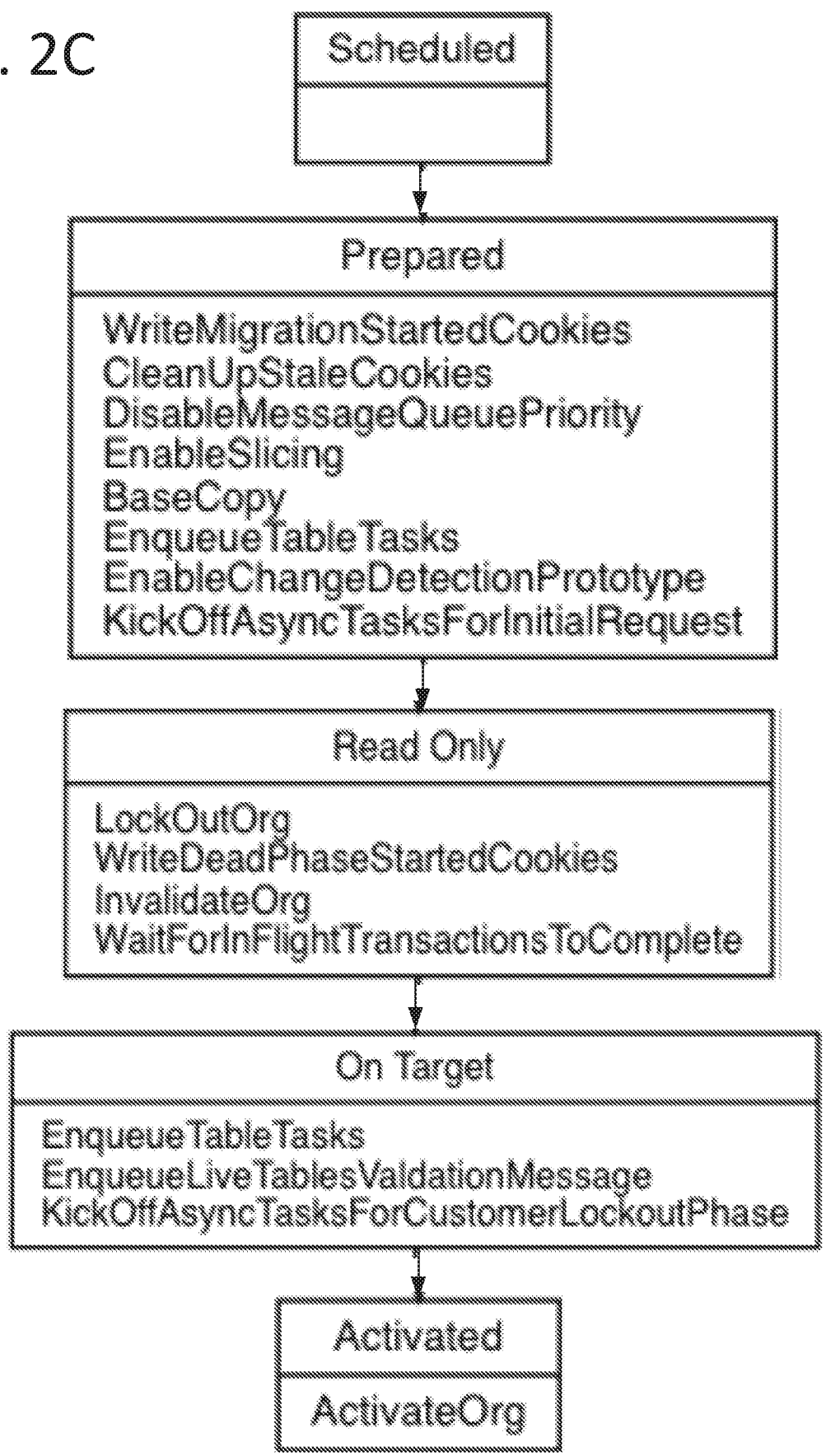
FIG. 2C illustrates an example dual-phase organization migration.

FIG. 2C illustrates an example dual-phase organization migration. As illustrated, the "Prepared" stage/state in the dual-phase organization migration comprises migration steps (or pre-migration steps) such as "WriteMigrationStartedCookies", "CleanUpStaleCookies", "DiableMessageQueuePriority", "EngableSlicing", "BaseCopy", "EnqueueTableTasks", "EnableChangeDetectionPrototype", "KickOffAsyncTasksForInitialRequest", etc. The "Read Only" stage/state in the dual-phase organization migration comprises migration steps (or pre-migration steps) such as "LockOutOrg", "WriteDeadPhaseStartedCookies", "InvalidateOrg", "WaitForInFlightTransactionsToComplete", etc. The "On Target" stage/state in the dual-phase organization migration comprises migration steps such as "EnqueueTableTasks", "EnqueueLiveTablesValidationMessage", "KickOffAsyncTasksForCustomerLockoutPhase", etc. The "Activated" stage/state in the dual-phase organization migration comprises migration steps (or post-migration steps) such as "ActivateOrg", etc.

In response to receiving a request for (scheduling) the dual-phase organization migration, the migration scheduler (102) starts the dual-phase organization migration by moving the migration orchestration engine (152) into the "Scheduled" stage/state for (a FSM representing) the organization migration. This "Scheduled" state can be used for performing migration steps (or rather pre-migration steps) that initiate HBase to migrate application data and that may take 24-48 hours to complete.

When the organization migration is ready to transition to the "Prepared" state/stage of the organization migration, the migration scheduler (102) can communicate with the migration orchestration engine (152), allowing the latter to transition the FSM representing the different stages/phases/states of the organization migration to the "Prepared" state/stage. While in the "Prepared" state/stage, the live phase of the two phases (e.g., live and dead phases, etc.) can begin; subscriptions to log miner (e.g., for redo logs, etc.) can begin after waiting for active transactions (e.g., inflight transactions, transactions already started but not yet completed at the current time point, not affecting transactions initiated after the log miner has been subscribed, etc.) to complete. The migration scheduler (102) can collect or track progresses of the migration steps that have been initiated for execution at any given time point.

Once the migration scheduler (102) has determined that a selected time window (e.g., a scheduled downtime window, a scheduled maintenance time window, etc.) for the organization migration has started, the migration scheduler (102) can communicate with the migration orchestration engine (152) to initiate the downtime (e.g., an orderly shutdown) for the organization to be migrated in the organization migration and initiates the transition to the "Read Only" state/stage. While in the "Read Only" state/stage, subscriptions are ended, once all existing transactions (e.g., inflight transactions, transactions already started but not yet completed at this time, not admitting/initiating any new transactions after this time, etc.) are complete.

After the migration orchestration engine (152) is done with the "Read Only" state/stage, the migration orchestration engine (152) notifies the migration scheduler (102) and awaits the next transition to the "On Target" state/stage. In the "On Target" state/stage as directed to enter by the migration scheduler (102), remaining changes (including but not limited to any changes from the inflight transactions, not captured by already migrated application data and/or application services) can be copied or applied to the target system instance to which the organization is being migrated. Once this is done, the migration scheduler (102) can drive the transition to the "Activated" state/stage.

Figure 2D:
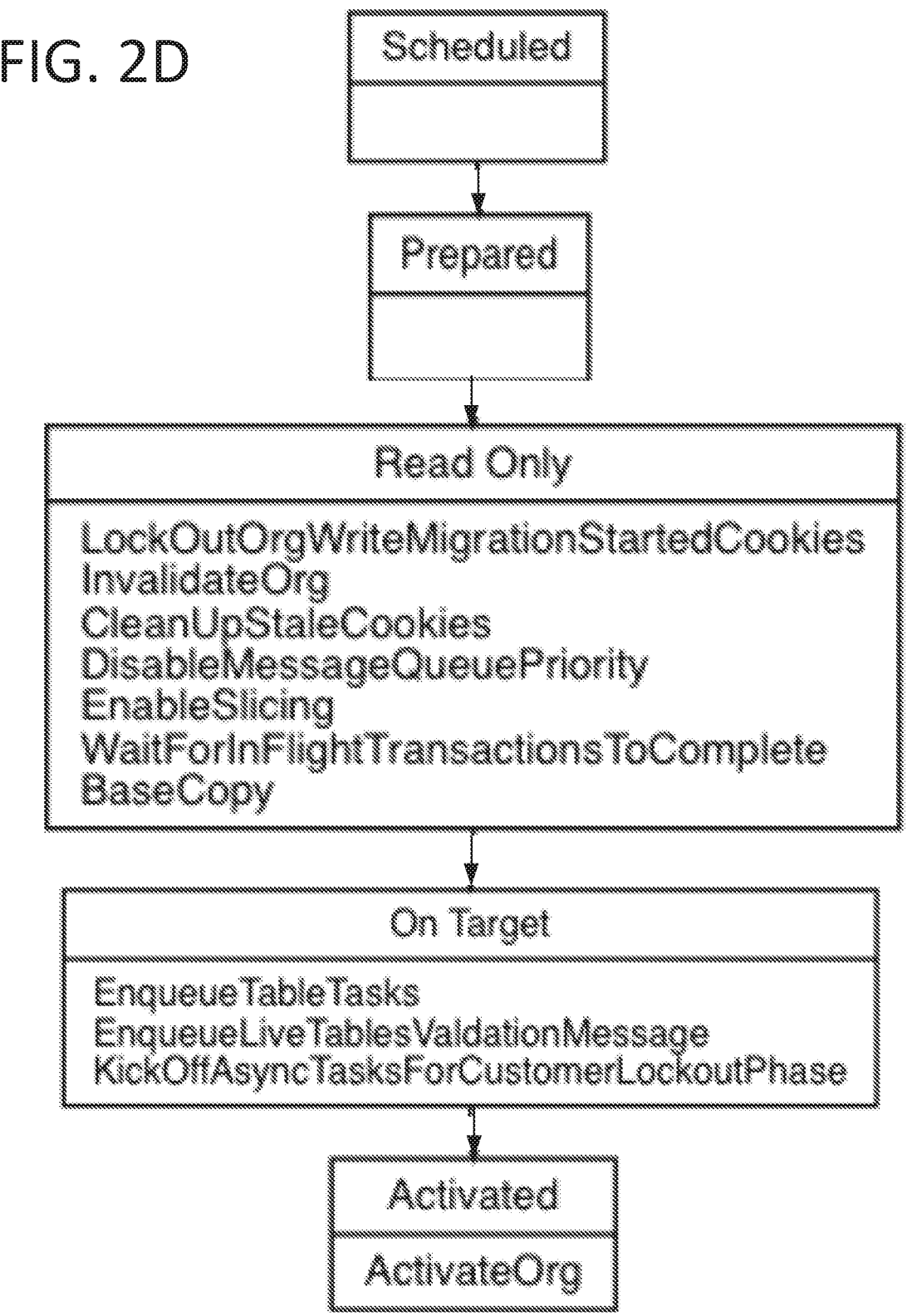
FIG. 2D illustrates an example single-phase organization migration.

FIG. 2D illustrates an example single-phase organization migration. As illustrated, the "Prepared" stage/state in the single-phase organization migration comprises no migration steps (or pre-migration steps). The "Read Only" stage/state in the single-phase organization migration comprises migration steps (or pre-migration steps) such as "LockOutOrgWriteMigrationStartedCookies", "InvalidateOrg", "CleanUpStaleCookies", "DisableMessageQueuePriroity", "EanbleSlicing", "WaitForInFlightTransactionsToComplete", "BaseCopy", etc. The "On Target" stage/state in the single-phase organization migration comprises migration steps (or pre-migration steps) such as "EnqueueTableTasks", "EnqueueLiveTablesValidationMessage", "KickOffAsyncTasksForCustomerLockoutPhase", etc. The "Activated" stage/state in the single-phase organization migration comprises migration steps (or post-migration steps) such as "ActivateOrg", etc.

In some embodiments, while in the "Scheduled" and "Prepared" states/stages of the single-phase organization migrations, no or few migration steps are performed. Once the migration orchestration engine (152) is allowed by the migration scheduler (102) to enter the "Read Only" state/stage, the migration orchestration engine (152) starts executing migration steps (or pre-/post-migration steps) in the single-phase organization migration.

2.5. Example Alternative Component Designs

In some embodiments, the migration scheduler (102) and the migration orchestration engine (152) coordinate with each other to control state transitions in an organization migration across all components, for example using commands generated from migration configuration data. In some other embodiments, state transitions may be defined in a component interface to be implemented by components as described herein individually. For each registered migration component, the migration orchestration engine (152) can call an appropriate transition (e.g., method, function, action, "schedule ( ... )" for the "Scheduled" state/stage, "prepare ( ... )" for the "Prepared" state/stage, etc.) as defined in the component interface based on the current state/stage of the organization migration.

Additionally, optionally or alternatively, to overcome possible temporal coupling issues involving implicit knowledge (e.g., schedule ( ... ) is called before prepare ( ... ), etc.) for transitions as defined in a single component interface, a series of state interfaces can be implemented by a component. Each state interface describes a particular state/stage of the organization migration, and handles a respective state transition. In some embodiments, the migration orchestration engine (152) can provide default implementations for the state interfaces. A component can use a default state interface implementation as defined by the migration orchestration engine (152) if no migration specific action or step is to take place in the component for that state.

Additionally, optionally or alternatively, components can encapsulate (or implement respective program logic for) each transition in program objects (e.g., interfaces, methods, etc.) and register these program objects with the migration orchestration engine (152). In this approach, the migration orchestration engine (152) (e.g., only, etc.) calls a transition if a program object—which encapsulates the transaction in a particular state—is valid (e.g., has been registered, etc.) for the particular state. Temporal ordering of different state transitions and/or different states can be provided, for example by looking at the ordinal of a state enum. Under this approach, each component chooses what transitions to implement. This approach can help provide code separation, reuse of a transition object to handle transitions between multiple states, ease in adding new states, etc.

2.6. Example Object Design for Executing Migration Steps

Figure 1C:
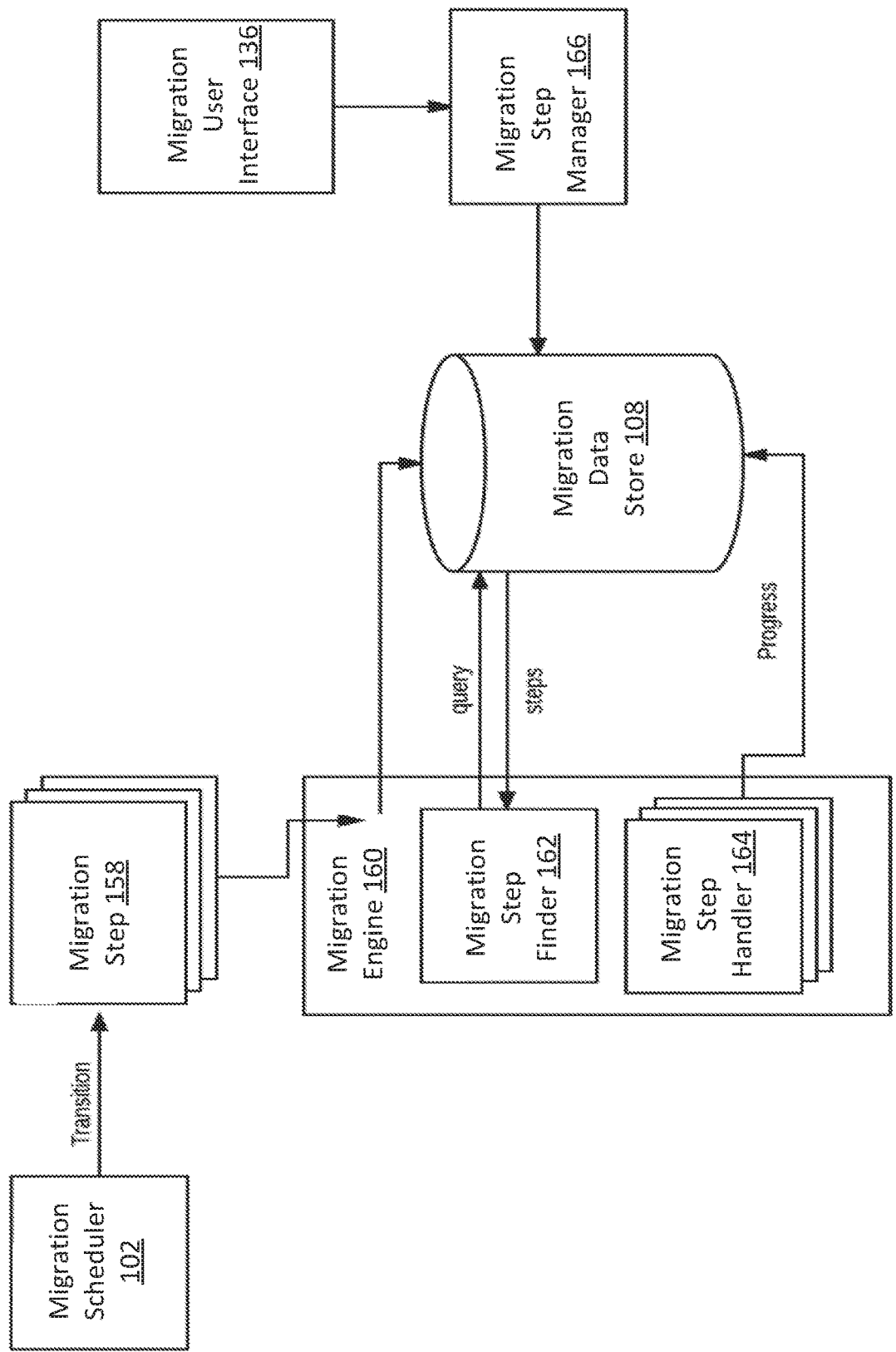
Figure 1D:
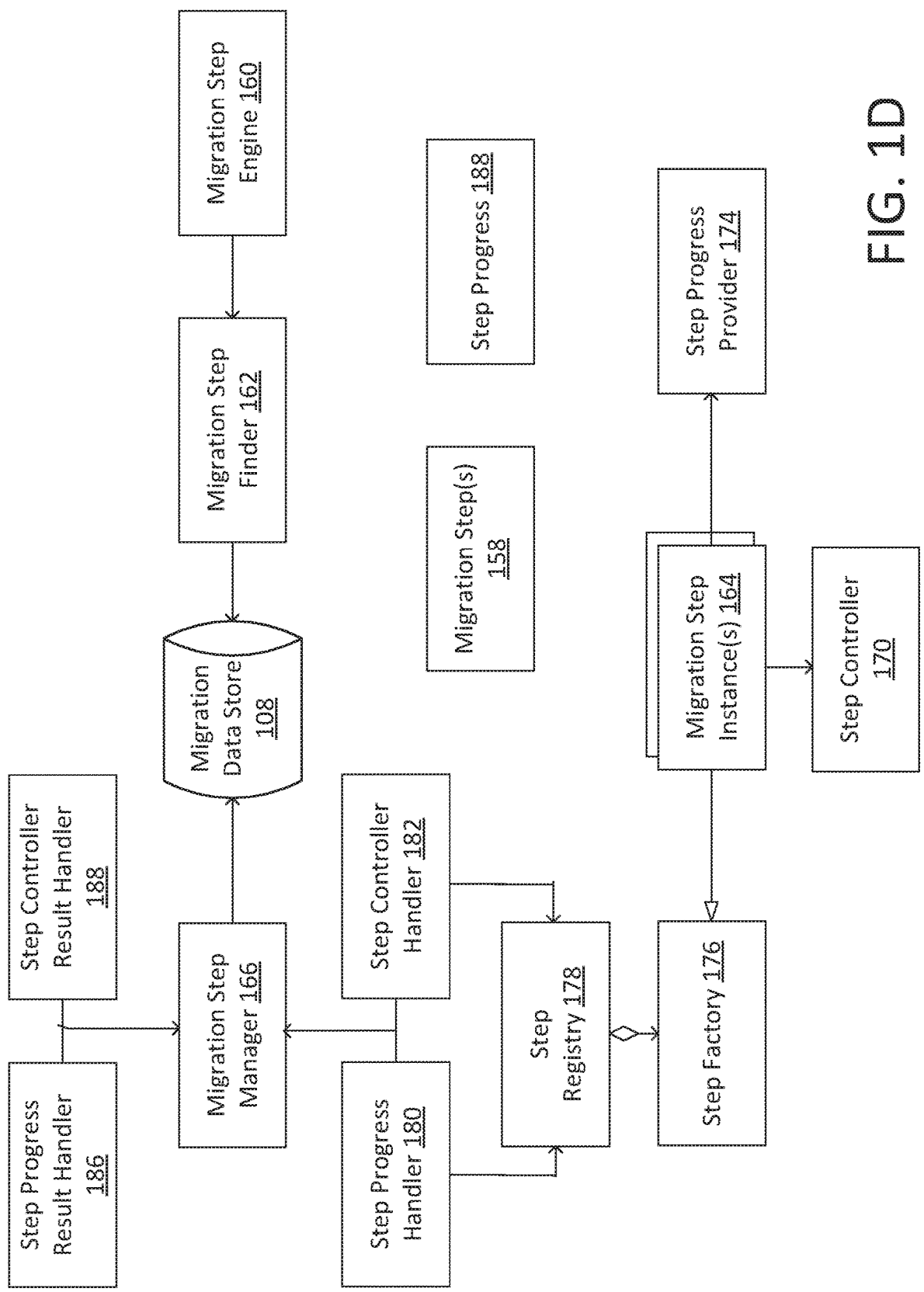
FIG. 1D illustrates an example object design for some processing entities in organization migrations.

FIG. 1D illustrates an example object design for a set of program interfaces, classes and/or objects to be used or implemented for executing, and tracking progresses of executing, migration steps in organization migrations as directed by the migration scheduler (102) and/or the migration orchestration engine (152).

As illustrated in TABLE 1 below, a step controller 170 represents an interface comprising a "launch ( ... )" method, which an engineer responsible for a to-be-migrated component can implement with specific program logic for a migration steps in the component to be invoked (directly or indirectly) for execution by the migration scheduler (102) and/or the migration orchestration engine (152). The interface as represented by the step controller (170) may further comprise a "cancel ( ... )" method, which can be used to cancel the execution of the specific program logic for the migration step implemented in the "launch( )" method.

Both the "launch ( ... )" and "cancel ( ... )" methods in the step controller (170) can be passed a connection and a step to launch or cancel. The connection is used to determine where the migration step is to run. If the step is to be run on the target system instance, a cross-instance (denoted as "XI") connection (e.g., to a remote database, etc.) is passed as the connection. Otherwise, a normal connection (e.g., an intra-instance connection, a local connection, to a local database, etc.) is passed as the connection.

Executing the migration step may, but is not necessarily limited to only, be asynchronous. For example, executing a migration step of setting up HBase Trust across HBase clusters can be done asynchronously.

TABLE 1

```
public interface StepController {
    void launch(Connection conn, Step step);
    void cancel(Connection conn, Step step);
}
```

As illustrated in TABLE 2, a migration step in migration step(s) (e.g., 158, etc.) may be a plain old java object (POJO) that represents a migration step, and may be constructed in Java based on a migration configuration data portion as retrieved from a data storage facility such as the migration data store (108). In some embodiments, serialized POJOs can be stored in a JSON file that may be converted back into the POJOs or instances thereof.

TABLE 2

```
public class Step {
    String id;
    String orgId;
    String migrationId;
    String name;
    String description;
    Scope scope;
    Long offset;
    State state;
    public enum State {
        CREATED,
        LAUNCHED, // or STARTED
        DONE,
        FAILED,
        SKIPPED;
    }
    public enum Scope {
        SOURCE, TARGET, BOTH
    }
    // getters/setters
}
```

As can be seen above, the migration step may comprise a number step-specific types, data fields, and methods including but not limited to a state (specifying the current state of the migration step; which is not the overall state/stage of an organization migration that includes the migration step) of the migration step, a scope (specifying where the migration step is to be run) of the migration step, getter methods, setter methods, and so forth.

As illustrated in TABLE 3 below, a step registry 178 represents an interface that may be implemented and used to register or get a step factory (e.g., 176, etc.) for a migration step. The step factory (176) or its implementer can be used for controlling the execution of the migration step, or querying for the progress of the migration step.

TABLE 3

```
public interface StepRegistry {
  public boolean register(String name, StepFactory factory);
  public StepFactory getFactory(String name);
}
```

As illustrated in TABLE 4, a step progress provider 174 represents an interface comprising a "report ( . . . )" method for migration step(s) to report progress(es).

TABLE 4

```
public interface StepProgressProvider {
  StepProgress report(Connection conn, Step step);
}
```

As illustrated in TABLE 5 below, the step factory (176) specifies "createStepController ( . . . )" and "createProgressProvider ( . . . )" methods respectively to be implemented for a specific migration step to create a step controller (e.g., 170, etc.) and a step progress provider (e.g., 174, etc.) for the specific migration step.

Since migration steps may be generated as POJOs from their respective migration configuration data portions stored in the migration data store (108), respective implementations of a step controller and a step progress provider need to be individually instantiated, for example as migration step instance(s) 164, for the migration steps.

TABLE 5

```
interface StepFactory {
  public abstract StepController createStepController( );
  public abstract StepProgressProvider createProgressProvider( );
}
```

In some embodiments, a data storage facility such as the migration data store (108) stores respective names of step factories for the migration steps. A name of a step factory for a migration step is used to get the migration step from the step registry (178), which in turn may be used to generate a migration step instance in the migration step instance(s) by creating a corresponding step controller and a corresponding step progress provider, for example based on specific overriding program logic as illustrated in TABLE 6 below for a migration step of setting up HBase trust.

TABLE 6

```
@Override
public StepProgressProvider createProgressProvider( ) {
  return HBaseTrust.progressProvider( );
}
public enum HBaseStepFactory implements StepFactory {
  @Override
  public StepController createStepController( ) {
    return HBaseTrust.stepController( );
  }
  @Override
  public StepProgressProvider createProgressProvider( ) {
    return HBaseTrust.progressProvider( );
  }
}
```

As illustrated in TABLE 7 below, a migration step finder (e.g., 162, etc.) may be implemented as a class/object that performs a lookup step for migration steps by querying for respective migration configuration data portions of the migration steps in storage such as in the migration data store (108). A migration step engine (e.g., 160, etc.) uses the migration step finder (162) to retrieve the migration configuration data portions for the migration steps and to use the migration configuration data portions to create POJOs representing the migration steps that need to be executed.

TABLE 7

```
class StepFinder {
  public List<Step> getSteps( ) {
    // look up Step in the database
  }
}
```

Looking up migration steps from a data storage can be done by comparing a start time of a migration step as specified in its migration configuration data with the current time (e.g., the time when the lookup is performed, etc.). For example, a migration step is due for execution if the migration step is in the "CREATED" state (see TABLE 2 above) and if the current time is after the start time of the migration step.

TABLE 8

```
SELECT * FROM migration_steps s
  WHERE s.start_time < currentTime
  AND s.state = 'CREATED'
```

A migration step engine (e.g., 160, etc.) may be implemented as a cron job that's responsible for:
1. Initializing step controllers and launching migration steps.
2. Collecting progresses for the migration steps.

The migration step engine (160) can use the migration step finder (162) to get—or create based on the respective migration configuration data portions—the migration steps from the data storage. For each migration step that has been launched, the migration step engine (160) can collect progress of each such migration step. For each migration step that is due for execution but has not yet been launched, the migration step engine (160) launches the migration step.

Controlling executing a migration step can be done through sending messages via message queues to a step controller for the migration step. In some embodiments, instead of adding a message type for each step execution control action, an enum as illustrated in TABLE 9 below can be used. The step execution control action can be passed as a message parameter when creating a message to be sent to the step controller. When the message is handled, the step execution control action, for example as specified with the enum, controls how the message is to be handled. Example types of step execution control actions may include, but are not necessarily limited to only, launch and cancel.

TABLE 9

```
public enum StepAction {
  LAUNCH, CANCEL;
}
```

In some embodiments, a step controller handler 182 represents a class/object that may be used to send a message for controlling executing a migration step. In some embodiments, if the step controller handler (182) fails to control executing the migration step, retries may be performed for a specific number of times. If the step controller handler (182) still fails, the step execution control action corresponding to the message can be reported as a failure.

Since the migration step can be executed on the target system instance (whereas the step controller handler (182) may be running on the source system instance), the step control handler (182) may perform checking out connections to free up resources (e.g., using CommittedDequeueTransactionBehavior, etc.).

Since a migration step can run on the target system instance, collecting a result (e.g., a response, a return status, etc.) to an earlier message representing a step execution control action from the migration step running on the target system instance may or may not be a straight forward operation.

Figure 1E:
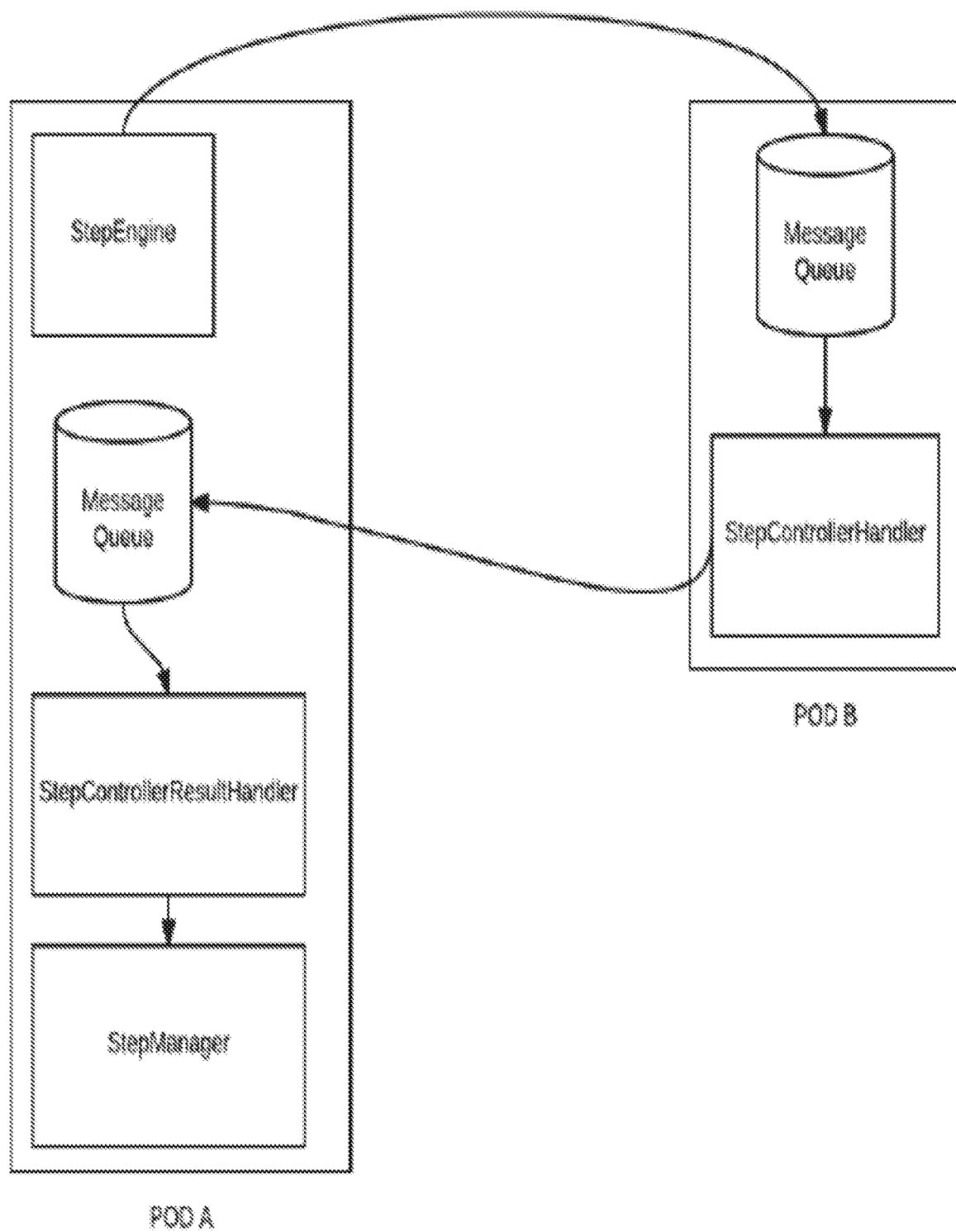
FIG. 1E and FIG. 1F illustrate examples of controlling executing migration steps running on target system instances.

In some embodiments, as illustrated in FIG. 1E, a step engine (denoted as "StepEngine") on the source system instance (denoted as "POD A") may enqueue a first XI message on the message queue of the target system instance (denoted as "POD B") to control executing a migration step (e.g., a query, a table insertion, to obtain HBase trust, etc.). A step controller (denoted as "StepControllerHandler") may enqueue a second XI message on the message queue of the source system instance to return the result of controlling executing the migration step. In some embodiments, the second XI message may be specifically composed to allow successful dequeuing of the second XI message from the message queue of the source system instance, for example by a step controller result handler (denoted as "StepControllerResultHandler") 188 of FIG. 3D. The result may be delivered to a step manager (denoted as "StepManager") on the source system instance that is interested in such a result.

Figure 1F:
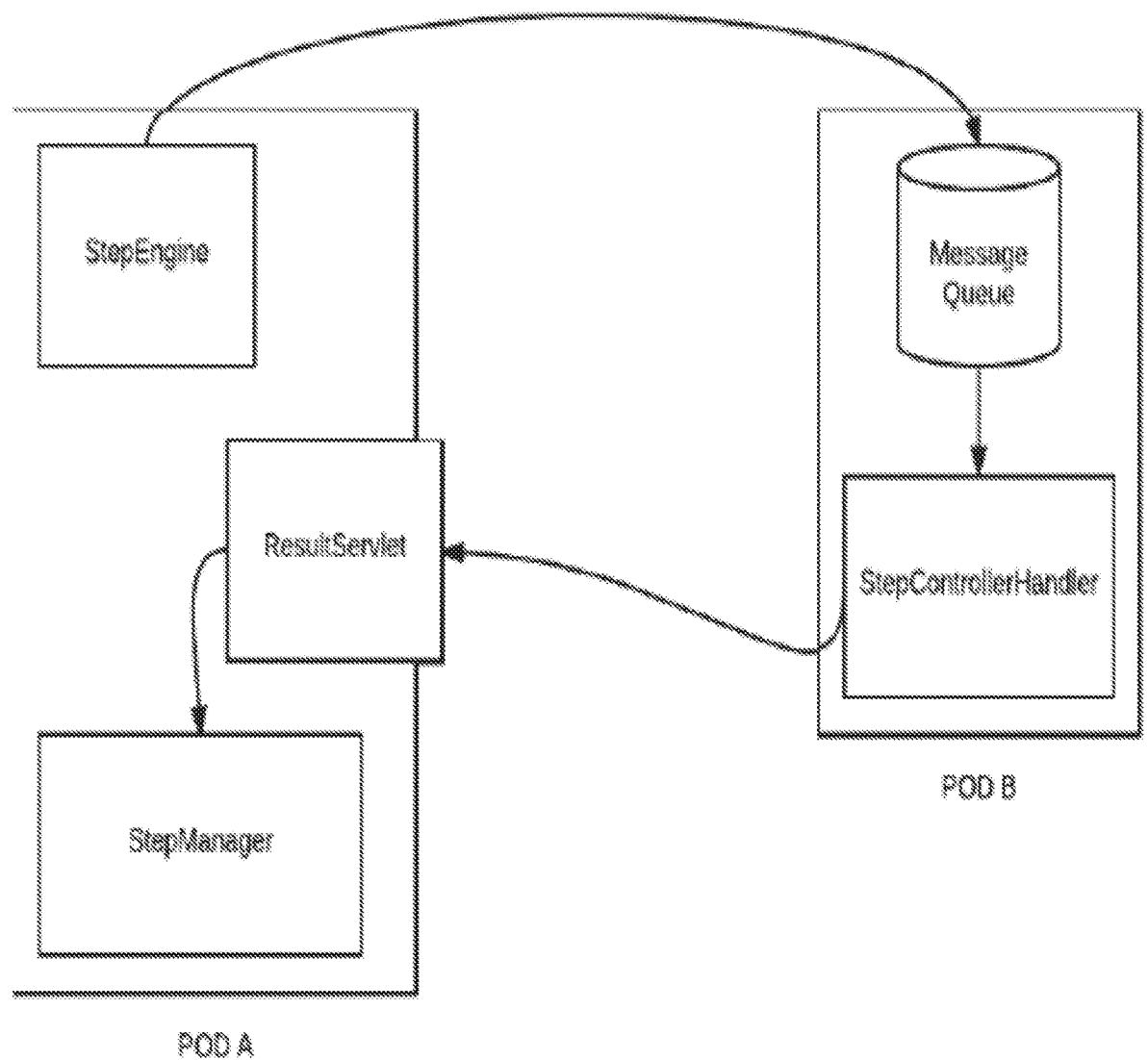

Additionally, optionally or alternatively, as illustrated in FIG. 1F, a servlet (denoted as "ResultServlet") may be used to push the result (e.g., in a JSON format, etc.) back to the source system instance, for example by constructing a URL and using the HTTP protocol to send a message in which the result is embedded.

In some embodiments, a step progress handler 182 represents a class/object that may be used to send a message for obtaining the current progress of a migration step.

Since the migration step can be executed on the target system instance (whereas the step progress handler (180) may be running on the source system instance), the step progress handler (180) may perform checking out connections to free up resources (e.g., using CommittedDequeueTransactionBehavior, etc.).

As in the case of controlling executing a migration step on the target system instance, since a migration step can run on the target system instance, collecting a result (e.g., a response, a return status, etc.) to an earlier message requesting the progress of the migration step running on the target system instance may or may not be a straight forward operation. Example requested results may include a result (e.g., success, failure, etc.) of table insertion operations in a migration step, a result (e.g., obtaining the trust, failing to obtain the trust, etc.) of setting up HBase trust between the source and target system instances.

In some embodiments, a step progress result handler 186 of FIG. 3D may be used to dequeue an XI message from the message queue of the source system instance that has been enqueued by the step progress handler (182) running on the target system instance. Additionally, optionally or alternatively, a servlet may be used to push the result (e.g., in a JSON format, etc.) back to the source system instance, for example by constructing a URL and using the HTTP protocol to send a message in which the result is embedded.

As illustrated in TABLE 10, a migration step manager (e.g., 166, etc.) can be implemented as a class/object with methods to collect and/or store individual progresses from migration steps. The migration step manager (166) can also act as an interface between a user/operator and the organization migration framework (100), for example allowing the user/operator to specify skipping a migration step.

TABLE 10

```
public void reportProgress(Step step, StepProgress progress) {
  ...
}
public StepProgress getProgress(Step step) {
  ...
}
public void skipStep(Step step) {
  ...
}
public void markFailed(Step step) {
  ...
  StepController controllr = step.getFactory( ).createStepController( );
  ...
  controller.cancel(conn, step);
}
public class StepManager {
  public void reportProgress(Step step, StepProgress progress) {
    ...
  }
  public StepProgress getProgress(Step step) {
    ...
  }
  public void skipStep(Step step) {
    ...
  }
  public void markFailed(Step step) {
    ...
    StepController controllr = step.getFactory( ).createStepController( );
    ...
    controller.cancel(conn, step);
  }
}
```

As illustrated in TABLE 11, a step progress 188 may be a POJO that describes the progress of a migration step. The progress can be, but is not necessarily limited to only, any string, and can be used to relay progress information from the migration step back to a user/operator. This allows for flexible progress messages, such as the current state as specified in the enum "State" in TABLE 2, state changes, percentages of completion, etc. A Boolean method isDone( ) can be used to control or trigger what happens when the migration step is finished processing.

TABLE 11

```
public boolean isDone( ) {
  return isDone;
}
public void setDone(boolean done) {
  isDone = done;
}
public String getProgress( ) {
  return progress;
}
public void setProgress(String progress) {
  this.progress = progress;
}
```

TABLE 11-continued

```
    public static StepProgress none( ) {
      StepProgress stepProgress = new StepProgress( );
      stepProgress.setProgress("none");
      return stepProgress;
    }
    public class StepProgress {
      boolean isDone;
      String progress;
      public boolean isDone( ) {
        return isDone;
      }
      public void setDone(boolean done) {
        isDone = done;
      }
      public String getProgress( ) {
        return progress;
      }
      public void setProgress(String progress) {
        this.progress = progress;
      }
      public static StepProgress none( ) {
        StepProgress stepProgress = new StepProgress( );
        stepProgress.setProgress("none");
        return stepProgress;
      }
    }
}
```

2.7. Example Alternative System Configuration

FIG. 1C illustrates an alternative example system configuration for organization migrations that comprises a migration scheduler (e.g., 102, etc.) and one or more program objects (e.g., processes, threads, objects, classes, interfaces, instantiations, implementers, methods, etc.) operating in conjunction with the migration scheduler (102).

In some embodiments, the alternative system configuration for organization migrations may allow the migration scheduler to bypass any migration orchestration engine (e.g., not implemented, etc.) and/or any migration component objects (e.g., not implemented, etc.) to directly interact with or invoke migration steps (e.g., 158, etc.) and other program objects to execute migration steps (including any pre-migration and/or post-migration steps) for an organization migration. In some embodiments, these migration steps as illustrated in FIG. 1C can be implemented by engineers for to-be-migrated components or (the systems of record) in an organization in the organization migration without being categorized explicitly with a to-be-migrated component or a migration component object.

3.0 EXAMPLE EMBODIMENTS

Figure 4:
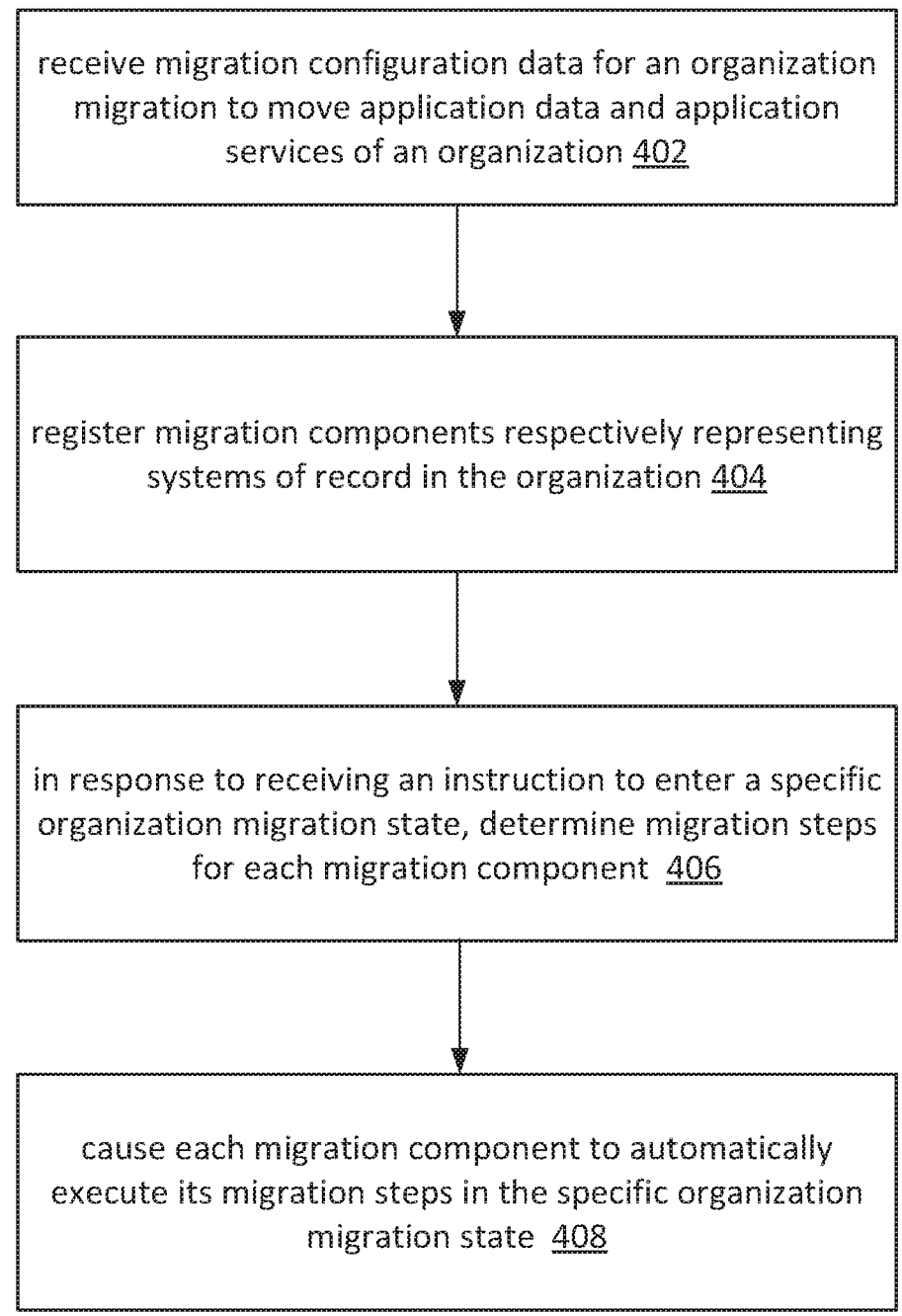
FIG. 4 illustrates an example process flow.

FIG. 4 illustrates an example process flow that may be implemented by a computing system (or device) as described herein. In block 402, a migration orchestration engine (e.g., 152 of FIG. 1B, etc.) receives migration configuration data for an organization migration to move application data and application services of a to-be-migrated organization hosted at a source system instance in a multi-tenant computing system to a target system instance in the multi-tenant computing system.

In block 404, the migration orchestration engine (152 of FIG. 1B) registers one or more migration components respectively representing one or more to-be-migrated systems of record in the to-be-migrated organization. Each migration component in the one or more migration components comprises a respective set of migration steps for each such migration component. The respective set of migration steps comprises one or more subsets of migration steps to be executed for each such migration component in a plurality of organization migration states. The respective set of migration steps is generated based on a set of migration configuration data portions, in the migration configuration data, related to each such component.

In block 406, in response to receiving an instruction to enter a specific organization migration state, the migration orchestration engine (152 of FIG. 1B) performs: determining a subset of migration steps for each migration component in the one or more migration components, the subset of migration steps to be executed in the specific organization migration state among the plurality of organization migration states.

In block 404, the migration orchestration engine (152 of FIG. 1B) causes each migration component in the one or more migration components to automatically execute a subset of migration steps, as determined for each such migration component, in the specific organization migration state.

In an embodiment, the one or more to-be-migrated systems of record in the to-be-migrated organization are determined based on the migration configuration data for the organization migration.

In an embodiment, the one or more migration components are registered in a component registry accessible to a migration orchestration engine that orchestrate executions of migration steps for the one or more migration components; the executions of migration steps for the one or more migration components are invoked by the migration orchestration engine using a component execution method implemented in each of the one or more migration components.

In an embodiment, the migration orchestration engine (152 of FIG. 1B) is further configured to perform: monitoring progresses of the subset of migration steps for each such migration component; reporting back by a migration orchestration to a migration scheduler individual progresses, in the organization migration, of the one or more migration components based on the progresses of the subset of migration steps for each such migration component.

In an embodiment, the migration orchestration engine (152 of FIG. 1B) is further configured to notify one or more operators of the progresses of the subset of migration steps for each such migration component.

In an embodiment, the migration orchestration engine (152 of FIG. 1B) is further configured to allow one or more operators to skip at least one migration step in migration steps executed by the one or more migration components for the organization migration state.

In an embodiment, the plurality of organization migration states is implemented as a finite state machine by a migration scheduler that operates with a migration orchestration engine; the migration orchestration engine provides a generic mechanism for all the one or more migration components in the organization migration to register in a component registry and for automatically executing migration steps implemented for migrating application data of the one or more systems of record as implemented in the one or more migration components in response to receiving instructions from the migration scheduler to enter different organization migration states among the plurality of organization migration states.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
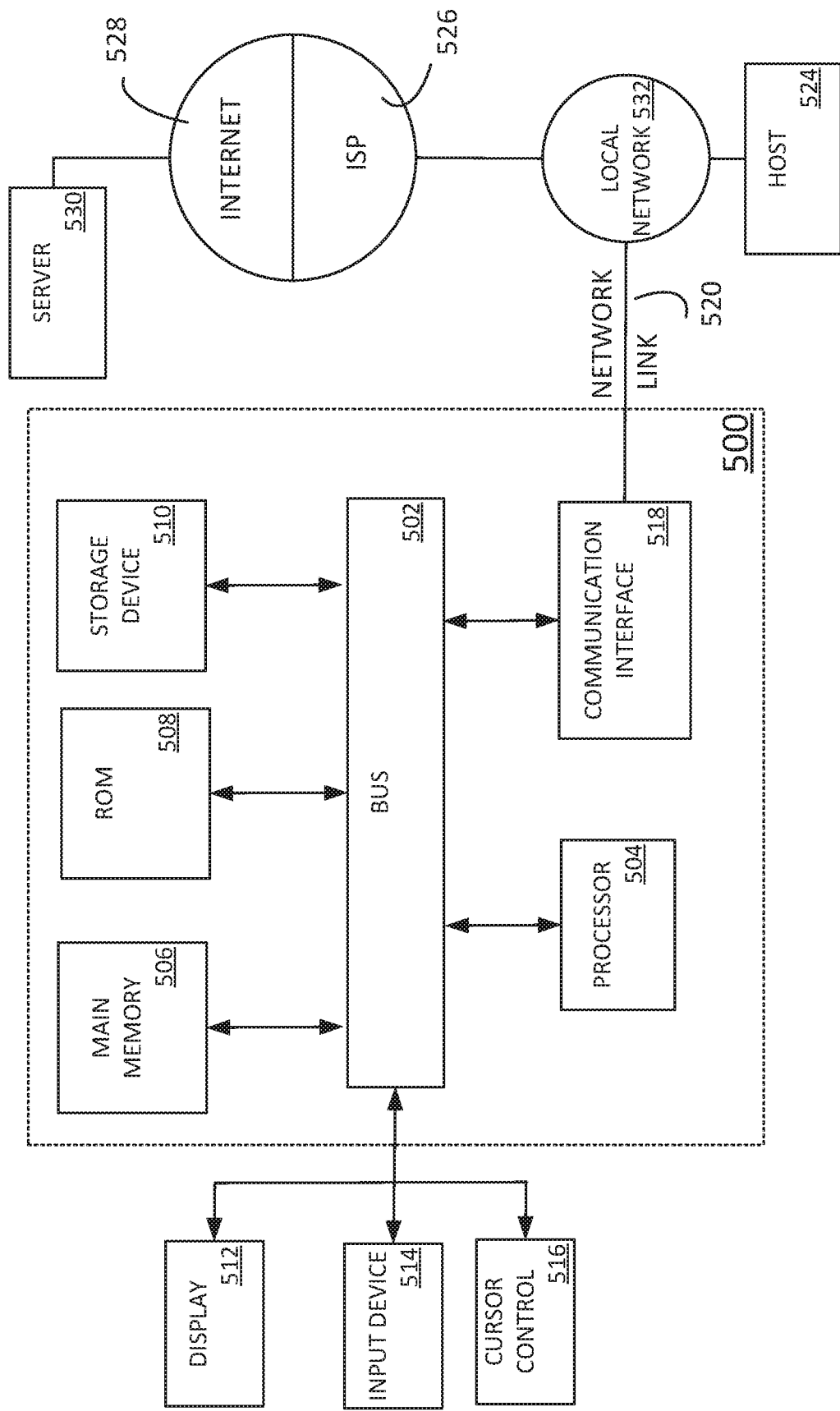
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising steps of:
wherein the steps are performed by a migration orchestration engine;
receiving, from a migration scheduler, migration configuration data for an organization migration to move application data and application services of a one or more to-be-migrated organizations hosted at a source system instance in a multi-tenant computing system to a target system instance in the multi-tenant computing system;
registering in a component registry based on the received migration configuration data, one or more migration components respectively representing one or more to-be-migrated systems of record in the one or more to-be-migrated organizations, wherein each migration component in the one or more migration components comprises a respective set of migration steps for said each migration component, wherein the respective set of migration steps comprises one or more subsets of migration steps to be executed for said each migration component in a plurality of organization migration states, wherein the respective set of migration steps is generated based on a set of migration configuration data portions, in the migration configuration data, related to said each migration component; wherein the respective set of migration steps is implemented in said each migration component; wherein said each migration component represents a respective to-be-migrated system of record in the one or more to-be-migrated systems of record; wherein the respective to-be-migrated system of record comprises respective application data and application services of a respective to-be-migrated organization of the one or more to-be-migrated organizations for said migration component;
in response to receiving an instruction from the migration scheduler to enter a specific organization migration state, performing:
determining a subset of migration steps, in the respective set of migration steps, for said each migration component in the one or more migration components, wherein the subset of migration steps is to be executed in the specific organization migration state among the plurality of organization migration states;
causing said each migration component in the one or more migration components to automatically execute the subset of migration steps, as determined for said each migration component, in the specific organization migration state.

2. The method as recited in claim 1, wherein the one or more to-be-migrated systems of record in the one or more to-be-migrated organizations are determined based on the migration configuration data for the organization migration.

3. The method as recited in claim 1, wherein the executions of the respective set of migration steps for the one or more migration components are invoked by the migration orchestration engine using a component execution method implemented in each of the one or more migration components.

4. The method as recited in claim 1, further comprising: monitoring progresses of the subset of migration steps for said each migration component; reporting back by the migration orchestration engine to the migration scheduler individual progresses, in the organization migration, of the one or more migration components based on the progresses of the subset of migration steps for said each migration component.

5. The method as recited in claim 1, further comprising: notifying one or more operators of the progresses of the subset of migration steps for said each migration component.

6. The method as recited in claim 1, further comprising: allowing one or more operators to skip at least one migration step in the respective set of migration steps executed by the one or more migration components for the specific organization migration state.

7. The method as recited in claim 1, wherein the plurality of organization migration states is implemented as a finite state machine by the migration scheduler that operates with the migration orchestration engine, wherein the migration orchestration engine provides a generic mechanism for all the one or more migration components in the organization migration to register in the component registry and for automatically executing migration steps implemented for migrating application data of the one or more systems of record as implemented in the one or more migration components in response to receiving instructions from the migration scheduler to enter different organization migration states among the plurality of organization migration states.

8. One or more non-transitory computer readable media storing a program of instructions that is executable by a device to perform steps of:
wherein the steps are performed by a migration orchestration engine;
  receiving, from a migration scheduler, migration configuration data for an organization migration to move application data and application services of a one or more to-be-migrated organizations hosted at a source system instance in a multi-tenant computing system to a target system instance in the multi-tenant computing system;
  registering in a component registry based on the received migration configuration data, one or more migration components respectively representing one or more to-be-migrated systems of record in the one or more to-be-migrated organizations, wherein each migration component in the one or more migration components comprises a respective set of migration steps for said each migration component, wherein the respective set of migration steps comprises one or more subsets of migration steps to be executed for said each migration component in a plurality of organization migration states, wherein the respective set of migration steps is generated based on a set of migration configuration data portions, in the migration configuration data, related to said each migration component; wherein the respective set of migration steps is implemented in said each migration component; wherein said each migration component represents a respective to-be-migrated system of record in the one or more to-be-migrated systems of record; wherein the respective to-be-migrated system of record comprises respective application data and application services of a respective to-be-migrated organization of the one or more to-be-migrated organizations for said migration component;
  in response to receiving an instruction from the migration scheduler to enter a specific organization migration state, performing:
  determining a subset of migration steps, in the respective set of migration steps, for said each migration component in the one or more migration components, wherein the subset of migration steps is to be executed in the specific organization migration state among the plurality of organization migration states;
  causing said each migration component in the one or more migration components to automatically execute the subset of migration steps, as determined for said each migration component, in the specific organization migration state.

9. The media as recited in claim 8, wherein the one or more to-be-migrated systems of record in the one or more to-be-migrated organizations are determined based on the migration configuration data for the organization migration.

10. The media as recited in claim 8, wherein the executions of the respective set of migration steps for the one or more migration components are invoked by the migration orchestration engine using a component execution method implemented in each of the one or more migration components.

11. The media as recited in claim 8, wherein the program of instructions is executable by a device to further perform: monitoring progresses of the subset of migration steps for said each migration component; reporting back by the migration orchestration engine to the migration scheduler individual progresses, in the organization migration, of the one or more migration components based on the progresses of the subset of migration steps for said each migration component.

12. The media as recited in claim 8, wherein the program of instructions is executable by a device to further perform: notifying one or more operators of the progresses of the subset of migration steps for said each migration component.

13. The media as recited in claim 8, wherein the program of instructions is executable by a device to further perform: allowing one or more operators to skip at least one migration step in the respective set of migration steps executed by the one or more migration components for the specific organization migration state.

14. The media as recited in claim 8, wherein the plurality of organization migration states is implemented as a finite state machine by the migration scheduler that operates with the migration orchestration engine, wherein the migration orchestration engine provides a generic mechanism for all the one or more migration components in the organization migration to register in the component registry and for automatically executing migration steps implemented for migrating application data of the one or more systems of record as implemented in the one or more migration components in response to receiving instructions from the migration scheduler to enter different organization migration states among the plurality of organization migration states.

15. A system, comprising:
  one or more computing processors;
  one or more non-transitory computer readable media storing a program of instructions that is executable by the one or more computing processors to perform steps of:
  wherein the steps are performed by a migration orchestration engine;
  receiving, from a migration scheduler, migration configuration data for an organization migration to move application data and application services of a one or more to-be-migrated organizations hosted at a source system instance in a multi-tenant computing system to a target system instance in the multi-tenant computing system;
  registering in a component registry based on the received migration configuration data, one or more migration components respectively representing one or more to-be-migrated systems of record in the one or more to-be-migrated organizations, wherein each migration component in the one or more migration components comprises a respective set of migration steps for said each migration component, wherein the respective set of migration steps comprises one or more subsets of migration steps to be executed for said each migration component in a plurality of organization migration states, wherein the respective set of migration steps is generated based on a set of migration configuration data portions, in the migration configuration data, related to said each migration component; wherein the respective set of migration steps is implemented in said each migration component; wherein said each migration component represents a respective to-be-migrated system of record in the one or more to-be-migrated systems of record; wherein the respective to-be-migrated system of record comprises respective application data and application services of a respective to-bemigrated organization of the one or more to-be-migrated organizations for said migration component;

in response to receiving an instruction from the migration scheduler to enter a specific organization migration state, performing:

determining a subset of migration steps, in the respective set of migration steps, for said each migration component in the one or more migration components, wherein the subset of migration steps is to be executed in the specific organization migration state among the plurality of organization migration states;

causing said each migration component in the one or more migration components to automatically execute the subset of migration steps, as determined for said each migration component, in the specific organization migration state.

16. The system as recited in claim 15, wherein the one or more to-be-migrated systems of record in the one or more to-be-migrated organizations are determined based on the migration configuration data for the organization migration.

17. The system as recited in claim 15, wherein the executions of the respective set of migration steps for the one or more migration components are invoked by the migration orchestration engine using a component execution method implemented in each of the one or more migration components.

18. The system as recited in claim 15, wherein the program of instructions is executable by a device to further perform: monitoring progresses of the subset of migration steps for said each migration component; reporting back by the migration orchestration engine to the migration scheduler individual progresses, in the organization migration, of the one or more migration components based on the progresses of the subset of migration steps for said each migration component.

19. The system as recited in claim 15, wherein the program of instructions is executable by a device to further perform: notifying one or more operators of the progresses of the subset of migration steps for said each migration component.

20. The system as recited in claim 15, wherein the program of instructions is executable by a device to further perform: allowing one or more operators to skip at least one migration step in the respective set of migration steps executed by the one or more migration components for the specific organization migration state.

21. The system as recited in claim 15, wherein the plurality of organization migration states is implemented as a finite state machine by the migration scheduler that operates with the migration orchestration engine, wherein the migration orchestration engine provides a generic mechanism for all the one or more migration components in the organization migration to register in the component registry and for automatically executing migration steps implemented for migrating application data of the one or more systems of record as implemented in the one or more migration components in response to receiving instructions from the migration scheduler to enter different organization migration states among the plurality of organization migration states.

* * * * *

UNITED STATES PATENT AND TRADEMARK OFFICE
CERTIFICATE OF CORRECTION

PATENT NO. : 10,776,147 B2
APPLICATION NO. : 15/882233
DATED : September 15, 2020
INVENTOR(S) : Ovesea et al.

Page 1 of 1

It is certified that error appears in the above-identified patent and that said Letters Patent is hereby corrected as shown below:

In the Claims

Column 33
Claim 1: Line 56: Delete "a"

Column 35
Claim 8: Line 12: Delete "a"

Column 36
Claim 15: Line 41: Delete "a"

Signed and Sealed this
Thirteenth Day of October, 2020

Andrei Iancu
*Director of the United States Patent and Trademark Office*